US009855532B2

(12) United States Patent
Lee et al.

(10) Patent No.: US 9,855,532 B2
(45) Date of Patent: Jan. 2, 2018

(54) GAS SEPARATION MEMBRANE WITH LADDER-STRUCTURED POLYSILSESQUIOXANE AND METHOD FOR FABRICATING THE SAME

(71) Applicant: Korea Institute of Science and Technology, Seoul (KR)

(72) Inventors: Jong Suk Lee, Seoul (KR); Seung Sang Hwang, Seoul (KR); Albert Sung Soo Lee, Seoul (KR); Sunghwan Park, Seoul (KR); Sang Hee Park, Seoul (KR); Sanghyup Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 30 days.

(21) Appl. No.: 14/697,363

(22) Filed: Apr. 27, 2015

(65) Prior Publication Data
US 2016/0107127 A1 Apr. 21, 2016

(30) Foreign Application Priority Data
Oct. 21, 2014 (KR) .......................... 10-2014-0142855

(51) Int. Cl.
*B01D 69/12* (2006.01)
*B01D 53/22* (2006.01)
(Continued)

(52) U.S. Cl.
CPC ......... *B01D 69/125* (2013.01); *B01D 53/228* (2013.01); *B01D 67/009* (2013.01);
(Continued)

(58) Field of Classification Search
CPC .. B01D 53/228; B01D 67/009; B01D 69/125; B01D 71/70; B01D 2323/08;
(Continued)

(56) References Cited

U.S. PATENT DOCUMENTS 7,790,803 B2 9/2010 Liu et al.
8,030,399 B2 10/2011 Liu et al.
(Continued)

FOREIGN PATENT DOCUMENTS

JP 2009-233540 A 10/2009
JP 2011-110552 A 6/2011
(Continued)

OTHER PUBLICATIONS

Kang, Woo Ram et al., "Free-standing polysilsesquioxane-based inorganic/organic hybrid membranes for gas separations", Oct. 2014, Journal of Membrane Science, 475, pp. 384-394.*
(Continued)

*Primary Examiner* — Jason M Greene
(74) *Attorney, Agent, or Firm* — NSIP Law

(57) ABSTRACT

The present disclosure provides a gas separation membrane using a ladder-structured polysilsesquioxane in which organic functional groups are attached to a long siloxane chain and a method for fabricating the same. In accordance with the present disclosure, a free-standing ladder-structured polysilsesquioxane-based membrane with various functional groups can be fabricated for gas separations. The performance of the gas separation membrane can be controlled through a variety of combinations of the organic functional groups linked to the siloxane chain. In addition, by controlling the molecular structure of the gas separation membrane through mixing of the ladder-structured polysilsesquioxane with an amine compound or conventional glassy or rubbery polymers or through thermal/UV-curing, the permeability and selectivity of the gas separation membrane can be controlled selectively.

17 Claims, 22 Drawing Sheets

(51) Int. Cl.
*B01D 67/00* (2006.01)
*B01D 71/70* (2006.01)
*C08G 77/18* (2006.01)

(52) U.S. Cl.
CPC .............. *B01D 71/70* (2013.01); *C08G 77/18* (2013.01); *B01D 2323/08* (2013.01); *B01D 2323/30* (2013.01); *B01D 2323/345* (2013.01); *B01D 2325/20* (2013.01)

(58) Field of Classification Search
CPC .......... B01D 2323/30; B01D 2323/345; B01D 2325/20; C08G 77/18
See application file for complete search history.

(56) References Cited

U.S. PATENT DOCUMENTS

| | | | |
|---|---|---|---|
| 8,709,254 | B2 | 4/2014 | Kreiter et al. |
| 2007/0022877 | A1 | 2/2007 | Marand et al. |
| 2009/0005530 | A1* | 1/2009 | Kashio ................... C08G 77/04 528/35 |
| 2011/0120940 | A1 | 5/2011 | Allen et al. |
| 2011/0260139 | A1* | 10/2011 | Baek ....................... C08G 77/26 257/40 |
| 2013/0277300 | A1* | 10/2013 | Nunes .................... B01D 69/02 210/500.25 |
| 2014/0287156 | A1* | 9/2014 | Kreiter ................. B01D 53/228 427/536 |
| 2015/0033945 | A1* | 2/2015 | Yamada ................ B01D 53/228 96/14 |
| 2015/0331153 | A1* | 11/2015 | Kang ..................... B05D 3/147 428/216 |
| 2016/0083526 | A1* | 3/2016 | Hwang .................. C08G 77/28 522/78 |

FOREIGN PATENT DOCUMENTS

| | | | |
|---|---|---|---|
| KR | 10-0800313 | B1 | 2/2008 |
| KR | 10-093998 | B1 | 1/2010 |
| KR | 10-2012-0124594 | A | 11/2012 |
| KR | 10-2013-01131184 | A | 10/2013 |
| KR | 1020130113184 | * | 10/2013 ............. B01D 69/12 |

OTHER PUBLICATIONS

Lee A. S. et al., "Cationically photopolymerizable epoxy-functionalized thermoplastic polysilsesquioxanes: synthesis and properties", RCS Advances, Oct. 2014, 4, pp. 56532-56538.*
Gao, Qiushuang et al., "Synthesis and characterization of functional ladder-like polysilsesquioxane and their hybrid films with polyimide", 2011, Thin Solid Films, 519, pp. 6499-6507.*
Kessler, Daniel, et al. "Synthesis of Functional Inorganic—Organic Hybrid Polymers Based on Poly (silsesquioxanes) and Their Thin Film Properties." Macromolecules 41.14 (2008): 5237-5244.
Raaijmakers, Michiel JT, et al. "Sieving of Hot Gases by Hyper-Cross-Linked Nanoscale-Hybrid Membranes." Journal of the American Chemical Society 136.1 (2013): 330-335.

* cited by examiner

LPPyr64

LPMA64

UV-crosslinked LPG64

UV-crosslinked LPMA64

UV-crosslinked LPPEOMASQ64

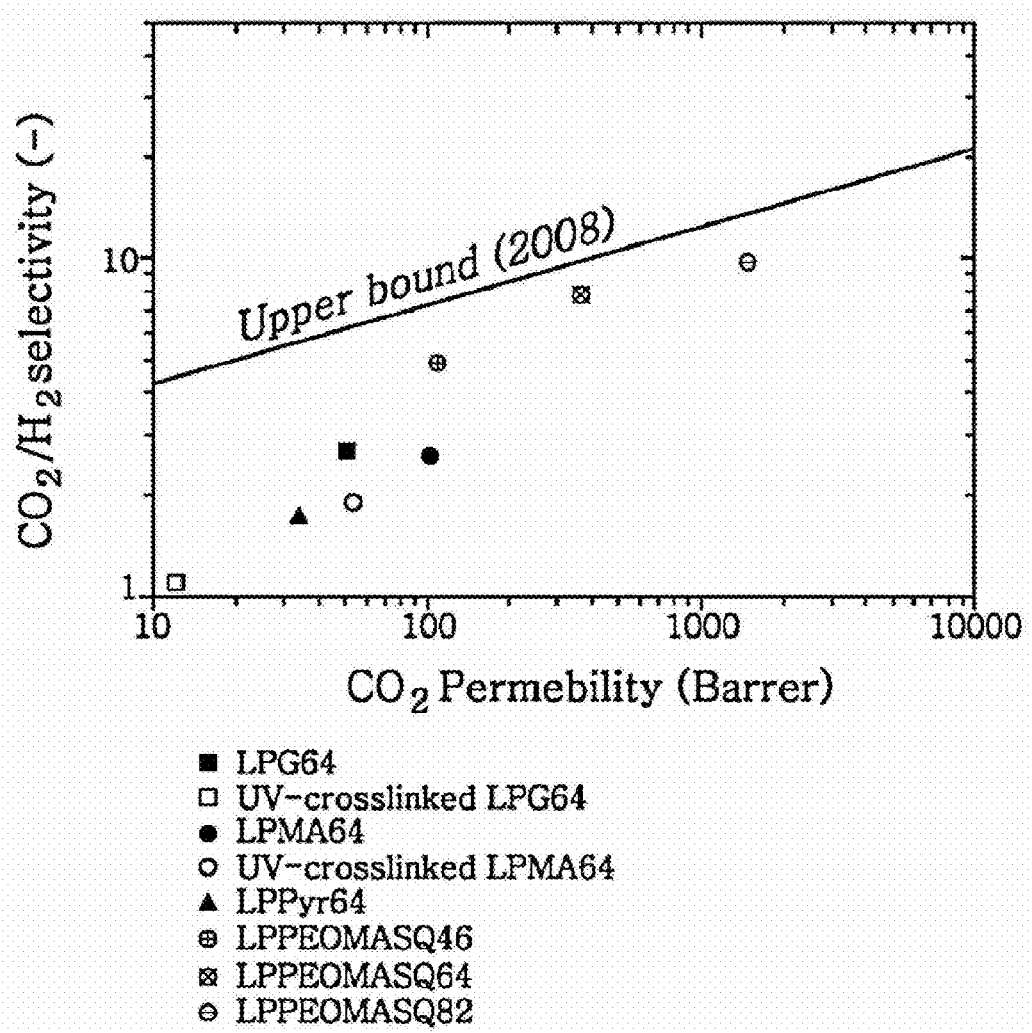

GAS SEPARATION MEMBRANE WITH LADDER-STRUCTURED POLYSILSESQUIOXANE AND METHOD FOR FABRICATING THE SAME

CROSS-REFERENCE TO RELATED APPLICATION

This application claims priority to Korean Patent Application No. 10-2014-0142855, filed on Oct. 21, 2014, and all the benefits accruing therefrom under 35 U.S.C. §119, the contents of which in its entirety are herein incorporated by reference.

BACKGROUND

1. Field

The present disclosure relates to a gas separation membrane with a ladder-structured polysilsesquioxane and a method for fabricating the same. More particularly, it relates to a gas separation membrane using a ladder-structured polysilsesquioxane with superior gas separation property or a composite thereof, gas selectivity and permeability of which can be selectively controlled by the crosslinking properties of the ladder-structured polysilsesquioxane, their organic functional groups, or the combination of both, and a method for fabricating the same.

[Description about National Research and Development Support]

This study was supported by the Korea CCS R&D Center (KCRC) (No. 2014M1A8A1049315) and Korea Institute of Energy Technology Evaluation and Planning (KETEP) (No. 20135010100750).

2. Description of the Related Art

The recent researches on new polymer materials are advancing toward functionalization to improve thermal, mechanical and electrical properties. In particular, organic-inorganic hybrid materials are drawing attentions. The most important things in the fabrication of organic-inorganic hybrid materials are compatibility between the organic polymer and inorganic sieves and stability without thermal degradation. As a material satisfying these requirements, highly heat-resistant polysilsesquioxane (PSSQ) is in the limelight (D. Kessler and P. Theato, *Macromolecules* 2008, 41, 5237-5244).

PSSQ is widely used in heat-resistant materials, weather-resistant materials, impact-resistant materials, packaging materials, encapsulation materials, insulating materials, lubricants, release agents, semi-gas-permeable coating materials, flexible substrates, etc. in the form of oil, rubber, resin, etc. and is recognized as a very important polymer in various industries.

Meanwhile, a gas separation process of separating a specific gas using a gas separation membrane is drawing a lot of attentions as the future energy technology with excellent energy efficiency and is also known as an environment-friendly technology.

The gas separation membrane used in the gas separation process is typically fabricated from an easily processable polymer such as cellulose acetate, polysulfone and polyimide. The gas separation membrane separates gases based on the solution-diffusion mechanism. That is to say, gas molecules are dissolved in the separation membrane at high pressure (solution), which diffuse through polymer chains (diffusion) and then are desorbed from the lower-pressure side of the gas separation membrane (desorption). The 'solution (sorption)' which is a thermodynamic factor, predominates as the critical temperature of the gas molecules is higher, whereas the kinetic factor 'diffusion' predominates as the size of the gas molecules is smaller.

However, although the above-described polymers used as the material of the gas separation membrane can be easily processed into a separation membrane, their separation performance should be improved for the commercialization. The separation performance of ladder-structured polysilsesquioxane-based membranes can be improved simply by engineering various organic functional groups with thermal/light-induced crosslinking.

REFERENCES OF THE RELATED ART

Non-Patent Document (Non-patent document 1) D. Kessler and P. Theato, *Macromolecules* 2008, 41, 5237-5244.

SUMMARY

The present disclosure is directed to providing a gas separation membrane using a ladder-structured polysilsesquioxane with superior gas separation property, gas selectivity and permeability of which can be selectively controlled by the crosslinking properties of the ladder-structured polysilsesquioxane, their organic functional groups, and the combination of both, and a method for fabricating the same.

In an aspect, the present disclosure provides a method for fabricating a gas separation membrane using a ladder-structured polysilsesquioxane.

In an exemplary embodiment of the present disclosure, the method may include preparing a free-standing gas separation membrane without any support by dissolving a ladder-structured polysilsesquioxane in a solvent and forming a gas separation membrane form.

In an exemplary embodiment of the present disclosure, the method may further include a phase inversion method after the dissolving.

In an exemplary embodiment of the present disclosure, the ladder-structured polysilsesquioxane may contain one or more crosslinkable organic functional group as a side chain.

In an exemplary embodiment of the present disclosure, the ladder-structured polysilsesquioxane may be represented by Chemical Formula 1:

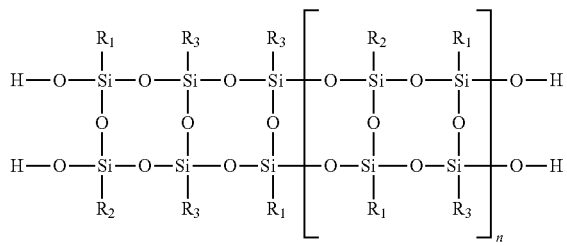

<Chemical Formula 1> wherein each of $R_1$, $R_2$ and $R_3$ is independently selected from a group consisting of an alkyl group, an allyl group, an amine group, a halogen, an alkyl halogen, a vinyl group, an aryl group, a polyethylene oxide group, a methacryl group, an acryl group and an epoxy group and at least one of the $R_1$, the $R_2$ and the $R_3$ is a crosslinkable organic functional group selected from a group consisting of a vinyl group, an aryl group, a methacryl group, an acryl group and an epoxy group, and n is an integer from 1 to 10,000.

In an exemplary embodiment of the present disclosure, the ladder-structured polysilsesquioxane may be crosslinked via photocuring or thermal curing.

In an exemplary embodiment of the present disclosure, the method may include mixing the ladder-structured polysilsesquioxane with an amine compound and thermally curing a mixture.

In an exemplary embodiment of the present disclosure, the amine compound may be one or more cage-like silsesquioxane selected from a group consisting of octaaminophenyl-T8-silsesquioxane, decaaminophenyl-T10-silsesquioxane and dodecaaminophenyl-T12-silsesquioxane.

In an exemplary embodiment of the present disclosure, the thermal curing may be performed at 210-280° C.

In an exemplary embodiment of the present disclosure, the amine compound may be mixed in an amount of 0-20 wt % based on the total weight of the mixture.

In an exemplary embodiment of the present disclosure, the method may include mixing the ladder-structured polysilsesquioxane with a photoinitiator and photocuring a mixture by irradiating UV.

In an exemplary embodiment of the present disclosure, the photoinitiator may be mixed in an amount of 1-3 wt % based on the total weight of the mixture.

In an exemplary embodiment of the present disclosure, the photocuring may be cationic photocuring or radical photocuring.

In an exemplary embodiment of the present disclosure, the ladder-structured polysilsesquioxane may contain an epoxy group and cationic photocuring may occur via ring-opening polymerization of the epoxy group under the UV irradiation.

In an exemplary embodiment of the present disclosure, the ladder-structured polysilsesquioxane may contain a methacryl group and radical photocuring may occur under the UV irradiation.

In another aspect, the present disclosure provides a gas separation membrane containing a ladder-structured polysilsesquioxane prepared by the method.

In an exemplary embodiment of the present disclosure, the gas separation membrane may separate a gas selected from a group consisting of $CO_2$, $H_2$, $He$, $O_2$, $CH_4$, $C_3H_6$, $C_3H_8$ and $N_2$.

In an exemplary embodiment of the present disclosure, the ladder-structured polysilsesquioxane may be blended with conventional rubbery or glassy polymers for the gas separation membrane.

In an exemplary embodiment of the present disclosure, the copolymer ratio of the ladder-structured polysilsesquioxane can be varied from 0:100 to 100:0 mol:mol.

The method for fabricating a gas separation membrane using a ladder-structured polysilsesquioxane according to the present disclosure allows for fabrication of a gas separation membrane not requiring a support due to a high degree of condensation as well as an appropriate ratio of flexible to rigid organic functional groups linked to the siloxane chain. The performance of the gas separation membrane can be controlled through a variety of combinations of the organic functional groups linked to the siloxane chain. In addition, by controlling the molecular structure of the gas separation membrane through mixing of the ladder-structured PSSQ with an amine compound or through curing, the permeability and selectivity of the gas separation membrane can be controlled selectively.

BRIEF DESCRIPTION OF THE DRAWINGS

FIGS. 12A and 12B show $CO_2/H_2$ and $CO_2/N_2$ separation performance of ladder-structured polysilsesquioxanes used in a gas separation membrane according to an exemplary embodiment of the present disclosure.

DETAILED DESCRIPTION

Figure 1:
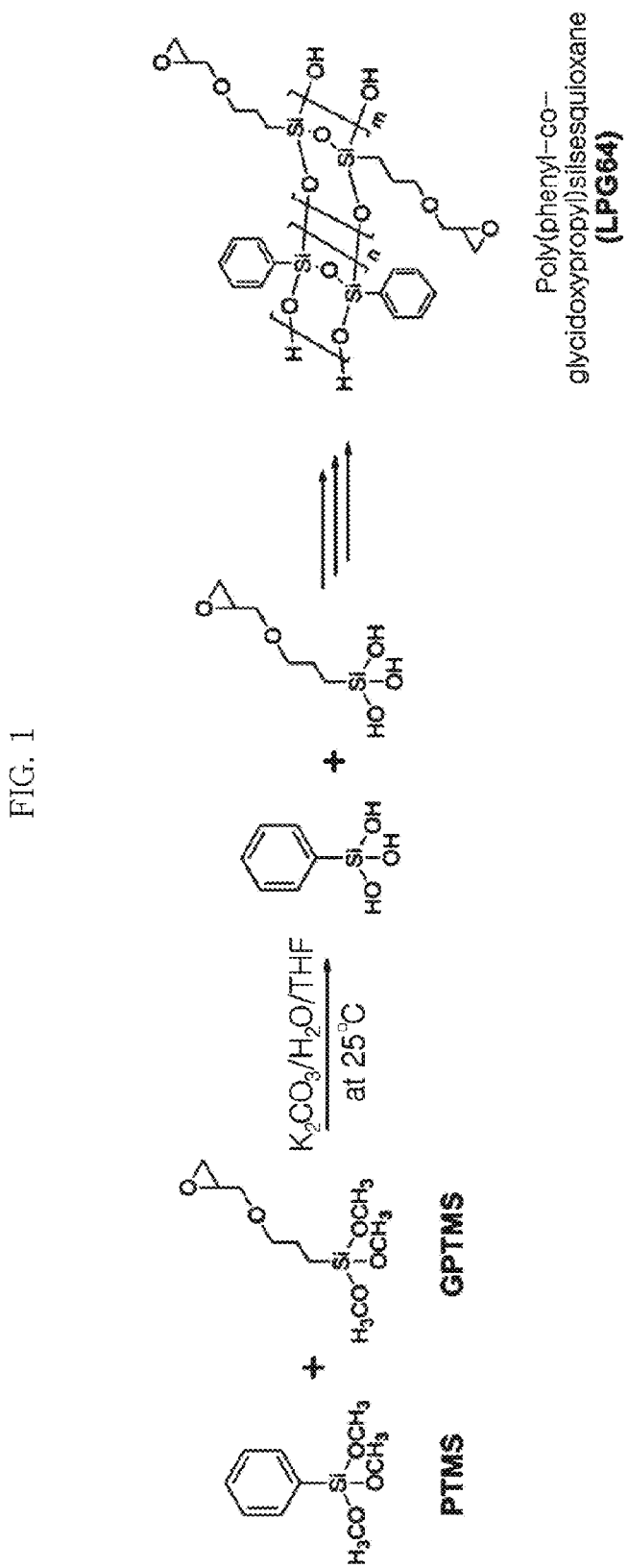
FIG. 1 describes a method for preparing a ladder-structured PSSQ according to an exemplary embodiment of the present disclosure.

Hereinafter, specific exemplary embodiments of the present disclosure will be described in detail so that those of ordinary skill in the art to which the present disclosure belongs can easily carry out the present disclosure.

The present disclosure provides a method for fabricating a gas separation membrane using a ladder-structured polysilsesquioxane. The method for fabricating a gas separation membrane according to the present disclosure may include preparing a gas separation membrane by dissolving a ladder-structured polysilsesquioxane in a solvent and forming the same into a gas separation membrane.

In the present disclosure, the ladder-structured polysilsesquioxane may be one containing one or more crosslinkable organic functional group as a side chain. The crosslinkable organic functional group is not particularly limited as long as it is crosslinkable. For example, it may be selected from a group consisting of a vinyl group, an aryl group, a methacryl group, an acryl group and an epoxy group.

Specifically, the ladder-structured polysilsesquioxane may be one represented by Chemical Formula 1:

<Chemical Formula 1>

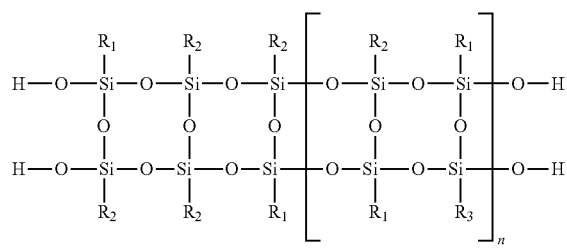

wherein each of $R_1$, $R_2$ and $R_3$ is independently selected from a group consisting of an alkyl group, an allyl group, an amine group, a halogen, an alkyl halogen, a vinyl group, an aryl group, a polyethylene oxide group, a methacryl group, an acryl group and an epoxy group and at least one of the $R_1$, the $R_2$ and the $R_3$ is a crosslinkable organic functional group selected from a group consisting of a vinyl group, an aryl group, a methacryl group, an acryl group and an epoxy group, and n is an integer from 1 to 10,000.

In the present disclosure, the ladder-structured polysilsesquioxane (LPSQ) may be a homopolymer or a copolymer having a regular ladder-structured structure. The polysilsesquioxane having a ladder-structured structure may be represented by Chemical Formula 2:

<Chemical Formula 2>

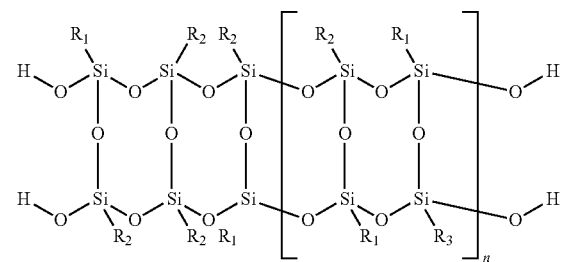

wherein $R_1$, $R_2$, $R_3$ and n are the same as defined in Chemical Formula 1.

In the present disclosure, the ladder-structured polysilsesquioxane may be crosslinked via photocuring or thermal curing.

Specifically, the method for fabricating a gas separation membrane of the present disclosure may include mixing the ladder-structured polysilsesquioxane with conventional rubbery/glassy polymers or an amine compound and thermally curing the same.

The amine compound includes both an aromatic amine compound and an aliphatic amine compound and is not particularly limited. Specifically, the amine compound may be a cage-like silsesquioxane and, for example, may be one or more cage-like silsesquioxane selected from a group consisting of octaaminophenyl-T8-silsesquioxane (OAFS), decaaminophenyl-T10-silsesquioxane and dodecaaminophenyl-T12-silsesquioxane.

The amine compound may be mixed in an amount of 0-20 wt %, or 1-20 wt % based on the total weight of the mixture. If the content of the amine compound is less than 1 wt %, crosslinking effect may be slight. And, if it exceeds 20 wt %, a thin film may not be formed. Herein, the mixture refers to a mixture of the ladder-structured polysilsesquioxane and the amine compound.

Figure 12B:
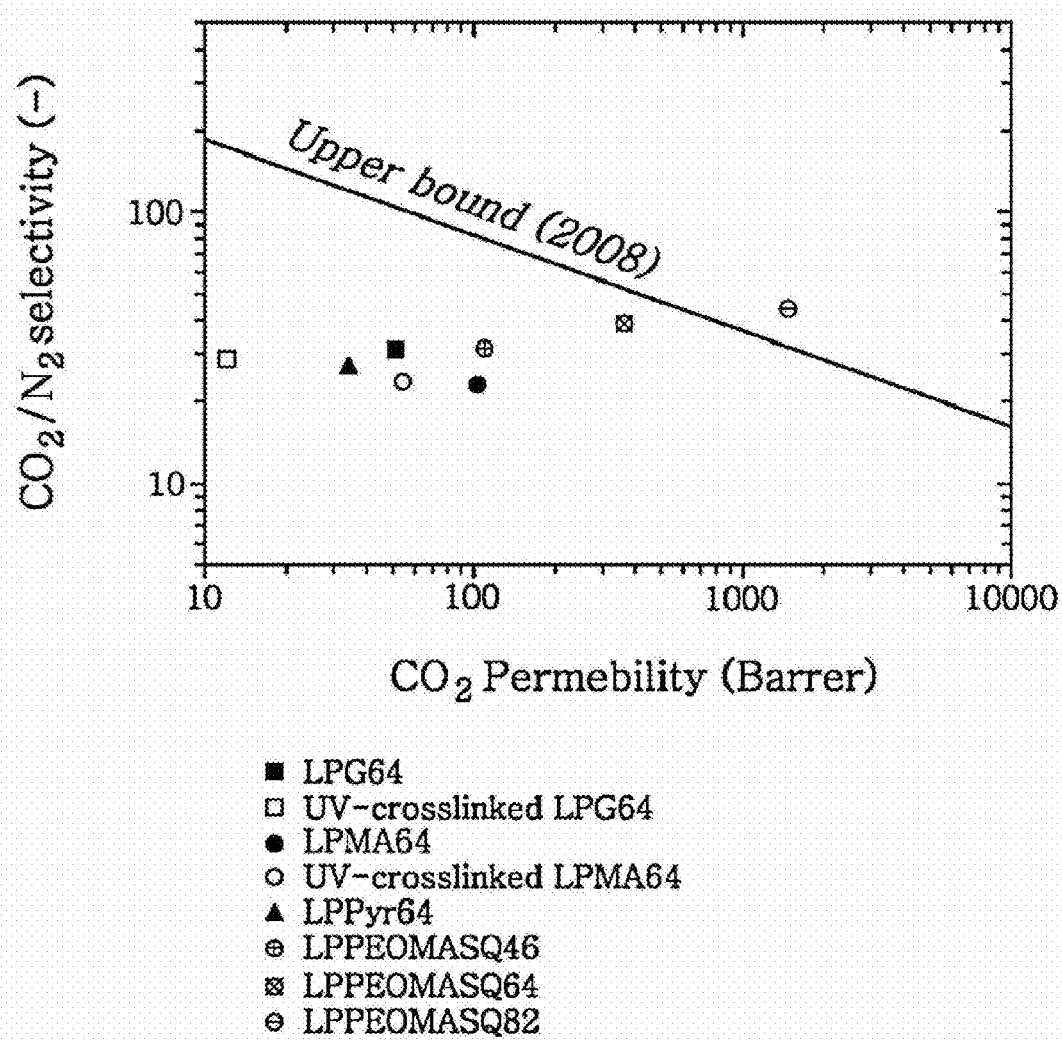

In another exemplary embodiment of the present disclosure, the ratio of copolymer of the ladder-structured polysilsesquioxane can be varied from 0:100 to 100:0 (mol:mol) depending on the combination of copolymers. For instance, ladder-structured polymer, poly(methoxy(polyethyleneoxy)propyl-co-methacryloxypropyl)silsesquioxane (LPPEO-MASQ) gas separation membranes with different copolymer ratios (i.e., methoxy(polyethyleneoxy)propyl:methacryloxypropyl=40:60, 60:40, 80:20 mol/mol denoted as LPPEO-MASQ46, LPPEOMASQ64, LPPEOMASQ82) were successfully fabricated via ultraviolet light-induced crosslinked reaction. Their $CO_2/N_2$ separation performances are shown in FIG. 12B.

Specifically, the thermal curing may be performed at 210-280° C., preferably 220-270° C. Below 220° C., thermal curing may not occur. And, a temperature exceeding 270° C. is unnecessarily high for thermal curing.

Also, specifically, the method for fabricating a gas separation membrane of the present disclosure may include mixing the ladder-structured polysilsesquioxane with a photoinitiator and photocuring the same by irradiating UV.

The photoinitiator is not particularly limited. For example, BASF's Irgacure 184, Irgacure 250, etc. may be used.

The photoinitiator may be mixed in an amount of 1-3 wt % based on the total weight of the mixture. If the content of the photoinitiator is less than 1 wt %, the degree of crosslinking may be low. And, if it exceeds 3 wt %, %, a thin film may not be formed. Herein, the mixture refers to a mixture of the ladder-structured polysilsesquioxane and the photoinitiator.

In the present disclosure, the photocuring may be cationic photocuring or radical photocuring.

In the present disclosure, when the ladder-structured polysilsesquioxane contains an epoxy group, cations may be generated upon UV irradiation and, as a result, cationic photocuring may occur via ring-opening polymerization of the epoxy group.

In the present disclosure, when the ladder-structured polysilsesquioxane contains a methacryl group, radical photocuring may occur upon UV irradiation.

The present disclosure also provides a gas separation membrane containing a ladder-structured polysilsesquioxane prepared by the above-described fabrication method.

For example, the gas separation membrane according to the present disclosure may separate a gas selected from a group consisting of $CO_2$, $H_2$, He, $O_2$, $CH_4$, $C_3H_6$, $C_3H_8$ and $N_2$, although not particularly being limited thereto. The gas separation membrane according to the present disclosure may have a $C_3H_6$ permeability of about 200-250 Barrer, specifically 244.70 Barrer, a $C_3H_8$ permeability of about 100-150 Barrer, specifically 111.36 Barrer, and a $C_3H_6/C_3H_8$ permeation selectivity of about 2.2 (–).

In general, a gas separation membrane consists of a selective layer which separates a gas and a support layer which physically supports the selective layer. The existing flat membrane has a spirally wound module structure with a large area-to-volume ratio. The existing hollow fiber membrane and the spirally wound module of the flat membrane require both the selective layer and the support layer.

A ladder-structured polysilsesquioxane according to the present disclosure can be blended with other glassy or rubbery polymers to improve the processibility and the potential candidates for polymers are polydialkylsiloxanes (ie. polydimethylsiloxane, polydiphenylsiloxane, and copolymers thereof), polyethylene oxide, polyphenyleneoxide, polysulfone, polyethersulfone, cellulose acetate, polyvinyl acetate, polyimide, polyetherimide, polyamide-imide, 6FDA-based polyimide (6FDA-DAM, 6FDA-DAM:DABA (3:2), 6FDA-mPDA, and copolymers thereof), polyacrylonitrile, polybenzimidazole, fluorinated polymers (perfluorethers, polyvinylidene fluoride, polytetrafluoroethlyene, polyhexafluoropropylene, polychlorotrifluoroethlene, and copolymers thereof.

In contrast, the present disclosure presents a gas separation membrane using a polysilsesquioxane (hereinafter, 'PSSQ'). That is to say, the present disclosure is based on the finding that a PSSQ exhibits separation property as it is and provides a PSSQ-based gas separation membrane not requiring a support and a method for fabricating the same.

The PSSQ-based gas separation membrane can be made to serve as a gas separation membrane without requiring a support since the PSSQ has few Si—OH groups due to a high degree of condensation and it can be stabilized by increasing molecular weight through a combination of organic functional groups attached to the siloxane chain (—Si—O—Si—).

The PSSQ is classified into a ladder-structured PSSQ and a cage-like PSSQ depending on the type of siloxane linkage. The crystalline cage-like PSSQ has a relatively smaller molecular weight, whereas the ladder-structured PSSQ exhibits excellent thermal and mechanical stability due to its long siloxane chain.

To obtain a ladder-structured PSSQ having a long siloxane chain and applicable to a gas separation membrane, a high degree of condensation should be induced between silanol groups during the synthesis of the ladder-structured PSSQ. In this regard, the present disclosure provides an optimized method for preparing a PSSQ.

Meanwhile, the ladder-structured PSSQ is provided with a crosslinkable organic functional group at the siloxane chain. The permeability and selectively of the gas separation membrane may be controlled via controlled bonding between the ladder-structured PSSQ and an amine compound mediated by the organic functional group. Specifically, the intermolecular chain-to-chain distance can be controlled depending on the organic functional groups, and the permeability and selectivity are determined as a result thereof. The gas separation membrane separates a specific target gas by separating a mixture of different gases into a permeating gas and a recovered gas. The permeability refers to the permeability of the gas passing through the gas separation membrane, and the (perm)selectivity refers to the ratio of the permeability of the faster gas to that of the slower gas.

In order to cure the ladder-structured PSSQ, it may be crosslinked with the amine compound or may be subjected to cationic photocuring or radical photocuring. The type of the ladder-structured PSSQ is different depending on the employed method. Specifically, when the ladder-structured PSSQ is crosslinked with the amine compound, a ladder-structured copolymeric epoxy PSSQ is used. When the cationic photocuring is employed, a cycloaliphatic epoxy-based ladder-structured PSSQ is used. And, when the radical photocuring is employed, a ladder-structured copolymeric methacrylate PSSQ is used.

Hereinafter, a gas separation membrane using a ladder-structured polysilsesquioxane and a method for fabricating the same according to an exemplary embodiment of the present disclosure will be described in detail.

The method for fabricating a gas separation membrane using a ladder-structured polysilsesquioxane according to an exemplary embodiment of the present disclosure may be classified into an exemplary embodiment wherein the gas separation membrane is fabricated based on a ladder-structured PSSQ (first exemplary embodiment), an exemplary embodiment wherein the gas separation membrane is fabricated based on a ladder-structured PSSQ and an amine compound (second exemplary embodiment), an exemplary embodiment wherein the gas separation membrane is fabricated via cationic photocuring of a ladder-structured PSSQ (third exemplary embodiment) and an exemplary embodiment wherein the gas separation membrane is fabricated via radical photocuring of a ladder-structured PSSQ (fourth exemplary embodiment).

The exemplary embodiment wherein the gas separation membrane is fabricated based on a ladder-structured PSSQ, i.e., the first exemplary embodiment, will be described. The method for fabricating a gas separation membrane based on a ladder-structured PSSQ of the first exemplary embodiment includes a step of preparing a ladder-structured PSSQ and a step of fabricating a gas separation membrane using the ladder-structured PSSQ.

FIG. 1 schematically describes a process of preparing a ladder-structured PSSQ. First, a precursor solution of a ladder-structured PSSQ and a basic reaction solution are prepared.

The precursor solution of a ladder-structured PSSQ may be prepared by preparing phenyltrimethoxysilane (hereinafter, 'PTMS') or epoxy-functionalized glycidoxypropyltrimethoxysilane (hereinafter, 'GPTMS') as a precursor of a ladder-structured PSSQ and mixing the PTMS and the GPTMS at a molar ratio of 5:5-7:3. If the content of the PTMS is higher than the above-described range, a film may not be formed due to high brittleness. And, if the content of the GPTMS is higher than the above-described range, the resulting film may be turbid because of too high flexibility.

The basic reaction solution induces hydrolysis and condensation of the precursor to a ladder-structured PSSQ. It may be prepared by mixing and stirring potassium carbonate ($K_2CO_3$) as a basic catalyst in a mixture of tetrahydrofuran (hereinafter, 'THF') and distilled water.

After the precursor solution of a ladder-structured PSSQ and the basic reaction solution have been prepared, the precursor solution of a ladder-structured PSSQ is added dropwise to the basic reaction solution and stirred for a predetermined time. Then, a ladder-structured PSSQ is formed as white powder via a sol-gel reaction as a result of hydrolysis and condensation of silanol groups.

The ladder-structured PSSQ formed in the basic reaction solution is separated through purification. For example, the purification may be performed by, after evaporating volatile substances, dissolving the white resinous material, i.e., the ladder-structured PSSQ, in dichloromethane and then extracting the ladder-structured PSSQ in the form of white powder through fractional distillation.

The ladder-structured structure of the prepared PSSQ may be identified through FT-IR analysis as described in the Examples section.

After the ladder-structured PSSQ has been prepared, a gas separation membrane is fabricated. The fabrication of a gas separation membrane using the ladder-structured PSSQ can be performed by a phase inversion method. Specifically, the prepared ladder-structured PSSQ powder is dissolved in THF, stirred for a predetermined time and then defoamed through ultrasonic irradiation. Subsequently, the THF solution in which the ladder-structured PSSQ powder is dissolved is knife casted on a hydrophobic-treated transparent substrate to a predetermined thickness. After a lapse of a predetermined time, the formed gas separation membrane is separated from the substrate. The fabricated gas separation membrane may be heat-treated at 100° C. in vacuo in order to remove the solvent components included therein.

Next, the second exemplary embodiment wherein the gas separation membrane is fabricated based on a ladder-structured PSSQ and an amine compound will be described. The fabrication method according to the second exemplary embodiment is described in FIGS. 2A and 2B.

First, a ladder-structured PSSQ and an amine compound are prepared. The amine compound refers to a polymer material having an amine group and crosslinkable with an epoxy group of the ladder-structured PSSQ. Hereinafter, OAPS will be described as an example.

The ladder-structured PSSQ may be prepared by the method for preparing a ladder-structured PSSQ of the first exemplary embodiment. Then, the ladder-structured PSSQ and OAPS are mixed at a weight ratio of 8:2-9:1 and then dissolved in THF. The THF solution in which the ladder-structured PSSQ and the OAPS are dissolved is knife casted in the same manner as described in the first exemplary embodiment to form a gas separation membrane.

The fabricated gas separation membrane may be heat-treated to induce crosslinking between the ladder-structured PSSQ and the OAPS. Specifically, the heat treatment may be performed at 210-280° C., preferably 220-270° C. More specifically, the crosslinking between the ladder-structured PSSQ and the OAPS refers to crosslinking between the epoxy group of the ladder-structured PSSQ and the amine group of the OAPS.

The crosslinking between the ladder-structured PSSQ and the OAPS affects the permeability and selectivity of the gas separation membrane. The crosslinking between the ladder-structured PSSQ and the OAPS results in increased density of the siloxane chain of the ladder-structured PSSQ (chain packing). The chain packing of the siloxane chain leads to decreased free volume of the gas separation membrane. In general, the decreased free volume of the gas separation membrane means decreased gas permeability and improved gas selectivity.

The permeability decrease/selectivity increase is proportional to the content of the OAPS in the gas separation membrane, as supported by the experimental result given below. If the content of the OAPS exceeds a predetermined level, the crosslinking between the ladder-structured PSSQ and the OAPS does not increase any more. Since the content of the OAPS is less than that of the ladder-structured PSSQ, it is desired that all the amine groups of the OAPS may be crosslinked with the epoxy groups of the ladder-structured PSSQ. However, if the content of the OAPS exceeds a predetermined level, unreacted amine groups remain due to the steric hindrance of the OAPS itself. As demonstrated in the Examples section of the present disclosure, the peak of the amine group is observed when 20 wt % of OAPS is mixed, whereas the amine group peak disappears through crosslinking when 10 wt % of OAPS is mixed. Based on this, the OAPS should be mixed in an amount of 1-20 wt % to control the permeability and selectivity of the gas separation membrane.

Next, the third exemplary embodiment wherein the gas separation membrane is fabricated via cationic photocuring of a ladder-structured PSSQ and the fourth exemplary embodiment wherein the gas separation membrane is fabricated via radical photocuring of a ladder-structured PSSQ will be described.

As described above, the crosslinking of a ladder-structured PSSQ can be achieved not only through crosslinking between the ladder-structured PSSQ and an amine compound but also through cationic photocuring or radical photocuring of the ladder-structured PSSQ. For the cationic photocuring, a cycloaliphatic epoxy-based ladder-structured PSSQ is used and, for the radical photocuring, a ladder-structured copolymeric methacrylate PSSQ is used.

The third exemplary embodiment will be described first.

First, a cycloaliphatic epoxy-based ladder-structured PSSQ is prepared.

2-(3,4-Epoxycyclohexyl)ethyltrimethoxysilane as a precursor of a cycloaliphatic epoxy-based ladder-structured PSSQ and a basic reaction solution are prepared. The basic reaction solution is the same as the basic reaction solution of the first exemplary embodiment (solution of potassium carbonate in THF and distilled water) and induces the hydrolysis and condensation of the 2-(3,4-epoxycyclohexyl) ethyltrimethoxysilane. Subsequently, the 2-(3,4-epoxycyclohexyl)ethyltrimethoxysilane is added dropwise to the basic reaction solution and stirred for a predetermined time. Then, a cycloaliphatic epoxy-based ladder-structured PSSQ is formed as white powder via a sol-gel reaction as a result of the hydrolysis and condensation of silanol groups. The cycloaliphatic epoxy-based ladder-structured PSSQ formed in the basic reaction solution is separated through purification in the same manner as described in the first exemplary embodiment.

After the cycloaliphatic epoxy-based ladder-structured PSSQ has been prepared, a gas separation membrane is fabricated. The prepared cycloaliphatic epoxy-based ladder-structured PSSQ is dissolved in methyl isobutyl ketone as an organic solvent. Then, a photoinitiator is added to the organic solvent and dissolved. The photoinitiator is a substance that induces polymerization of polymer materials upon UV irradiation. A previously known photoinitiator (e.g., BASF's Irgacure 250) may be used. The photoinitiator is added in an amount of 1-3 wt %.

Subsequently, the solution wherein the cycloaliphatic epoxy-based ladder-structured PSSQ and the photoinitiator are dissolved is coated on a hydrophobic-treated transparent substrate to a predetermined thickness. Then, the formed gas separation membrane is irradiated with UV to induce cationic photocuring. When the gas separation membrane is irradiated with UV, cationic acids are generated. The cationic acids react with the epoxy groups via ring-opening polymerization, thereby completing photocuring.

Then, the fourth exemplary embodiment will be described.

First, a polyethylene oxide-based ladder-structured PSSQ is prepared.

A mixture solution of 2-[methoxy(polyethyleneoxy)propyl]trimethoxysilane and 3-methacryloxypropyltrimethoxysilane as precursors of a polyethylene oxide-based ladder-structured PSSQ and a basic reaction solution are prepared. The basic reaction solution is the same as the basic reaction solution of the first exemplary embodiment (solution of potassium carbonate in THF and distilled water) and induces the hydrolysis and condensation of the 2-[methoxy(polyethyleneoxy)propyl]trimethoxysilane. Subsequently, the 2-[methoxy(polyethyleneoxy)propyl]trimethoxysilane is added dropwise to the basic reaction solution and stirred for a predetermined time. Then, a polyethylene oxide-based ladder-structured PSSQ is formed as white powder via a sol-gel reaction as a result of the hydrolysis and condensation of silanol groups. The polyethylene oxide-based ladder-structured PSSQ formed in the basic reaction solution is separated through purification in the same manner as described in the first exemplary embodiment.

After the polyethylene oxide-based ladder-structured PSSQ has been prepared, a gas separation membrane is fabricated. The prepared polyethylene oxide-based ladder-structured PSSQ is dissolved in methyl isobutyl ketone as an organic solvent. Then, a photoinitiator is added to the organic solvent and dissolved. The photoinitiator is a substance that induces polymerization of polymer materials upon UV irradiation. A previously known photoinitiator (e.g., BASF's Irgacure 184) may be used. The photoinitiator is added in an amount of 1-3 wt %.

Subsequently, the solution wherein the polyethylene oxide-based ladder-structured PSSQ and the photoinitiator are dissolved is coated on a hydrophobic-treated transparent substrate to a predetermined thickness. Then, the formed gas separation membrane is irradiated with UV to induce radical photocuring. When the gas separation membrane is irradiated with UV, radicals are generated and photocuring of methacryl groups occurs.

Next, a fifth exemplary embodiment will be described.

First, to prepare a ladder-structured copolymeric methacrylate PSSQ, a precursor solution of a ladder-structured copolymeric methacrylate PSSQ and a basic reaction solution are prepared.

The precursor solution of a ladder-structured copolymeric methacrylate PSSQ is prepared by mixing 3-methacryloxypropyltrimethoxysilane with phenyltrimethoxysilane (PTMS) and the basic reaction solution is prepared in the same manner as the basic reaction solution of the first exemplary embodiment. Subsequently, the precursor solution of a ladder-structured copolymeric methacrylate PSSQ, i.e. the monomer mixture solution of the 3-methacryloxypropyltrimethoxysilane and the PTMS, are added dropwise to the basic reaction solution and stirred for a predetermined time. Then, a ladder-structured copolymeric methacrylate PSSQ is formed as white powder via a sol-gel reaction as a result of the hydrolysis and condensation of silanol groups. The ladder-structured copolymeric methacrylate PSSQ formed in the basic reaction solution is separated through purification in the same manner as described in the first exemplary embodiment.

After the ladder-structured copolymeric methacrylate PSSQ has been prepared, a gas separation membrane is fabricated. The prepared ladder-structured copolymeric methacrylate PSSQ is dissolved in an organic solvent such as methyl isobutyl ketone and tetrahydrofuran. Then, a photoinitiator is added to the organic solvent and dissolved. The photoinitiator is a substance that induces polymerization of polymer materials upon UV irradiation. A previously known photoinitiator (e.g., BASF's Irgacure 184) may be used. The photoinitiator is added in an amount of 1-3 wt %.

Subsequently, the solution wherein the ladder-structured copolymeric methacrylate PSSQ and the photoinitiator are dissolved is coated on a hydrophobic-treated transparent substrate to a predetermined thickness. Then, the formed gas separation membrane is irradiated with UV to induce radical photocuring. When the gas separation membrane is irradiated with UV, radicals are generated and photocuring of the ladder-structured copolymeric methacrylate PSSQ occurs by the radicals.

A gas separation membrane using a ladder-structured polysilsesquioxane and a method for fabricating the same according to an exemplary embodiment of the present disclosure have been described above. Hereinafter, the present disclosure will be described in more detail through examples.

Example 1: Preparation of Ladder-Structured PSSQ (LPG64)

A monomer mixture solution (PTMS:GPTMS=6:4) was prepared by mixing 0.48 mol of PTMS (9.52 g) and 0.32 mol of GPTMS (7.95 g). A basic reaction solution was prepared by mixing 0.22 mol of THF (16 g), 0.27 mol of deionized water (4.8 g) and 0.29 mol of potassium carbonate (0.04 g). Under nitrogen atmosphere, the monomer mixture solution was added dropwise to the basic reaction solution. The mixture of the monomer mixture solution and the basic reaction solution was stirred for 5 days. After evaporating volatile substances, the obtained white resinous material was dissolved in dichloromethane and extracted several times with water. The white resinous material was filtered and dried with anhydrous magnesium sulfate. 13.3 g of a PSSQ was obtained as powder (yield: 95%).

Example 2: Fabrication of LPG64-Based Gas Separation Membrane and LPG64/OAPS-Based Gas Separation Membrane The LPG64 powder prepared in Example 1 was dissolved in THF and stirred overnight at room temperature. Air bubbles were removed from the solution via ultrasonic irradiation for 20 minutes. The THF solution in which the ladder-structured PSSQ powder was dissolved was knife casted onto a hydrophobic-treated transparent glass. 12 hours later, the resulting membrane was separated from the transparent glass and the remaining solvent component was removed by drying at 100° C. for 1 hour. As a result, an LPG64-based gas separation membrane was obtained.

An LPG64/OAPS-based gas separation membrane was fabricated in the same manner as that of the LPG64-based gas separation membrane. But, whereas the LPG64-based gas separation membrane was heat-treated at 100° C. for 1 hour, the LPG64/OAPS-based gas separation membrane was heat-treated at 250° C. for 100 minutes in order to induce crosslinking between LPG64 and OAPS. In addition, the LPG64/OAPS-based gas separation membrane was fabricated by mixing LPG64 and OAPS at a ratio of 90:10 or 80:20 (see Table 1).

TABLE 1

Composition of LPG64-based and LPG64/OAPS-based gas separation membranes

|  | LPG64 | OAPS | THF |
|---|---|---|---|
| LPG64 | 70 wt % | 0 | 30 wt % |
| LPG64/OAPS (90/10) | 63 wt % | 7 wt % | 30 wt % |
| LPG64/OAPS (80/20) | 56 wt % | 14 wt % | 30 wt % |

Example 3: Characterization of LPG64-Based Gas Separation Membrane

PSSQ is classified into a ladder-structured PSSQ and a cage-like PSSQ depending on the type of siloxane linkage and shows different characteristic peaks depending on the structure. For structural analysis of the PSSQ prepared in Example 1, FT-IR measurement was carried out.

Figure 3:
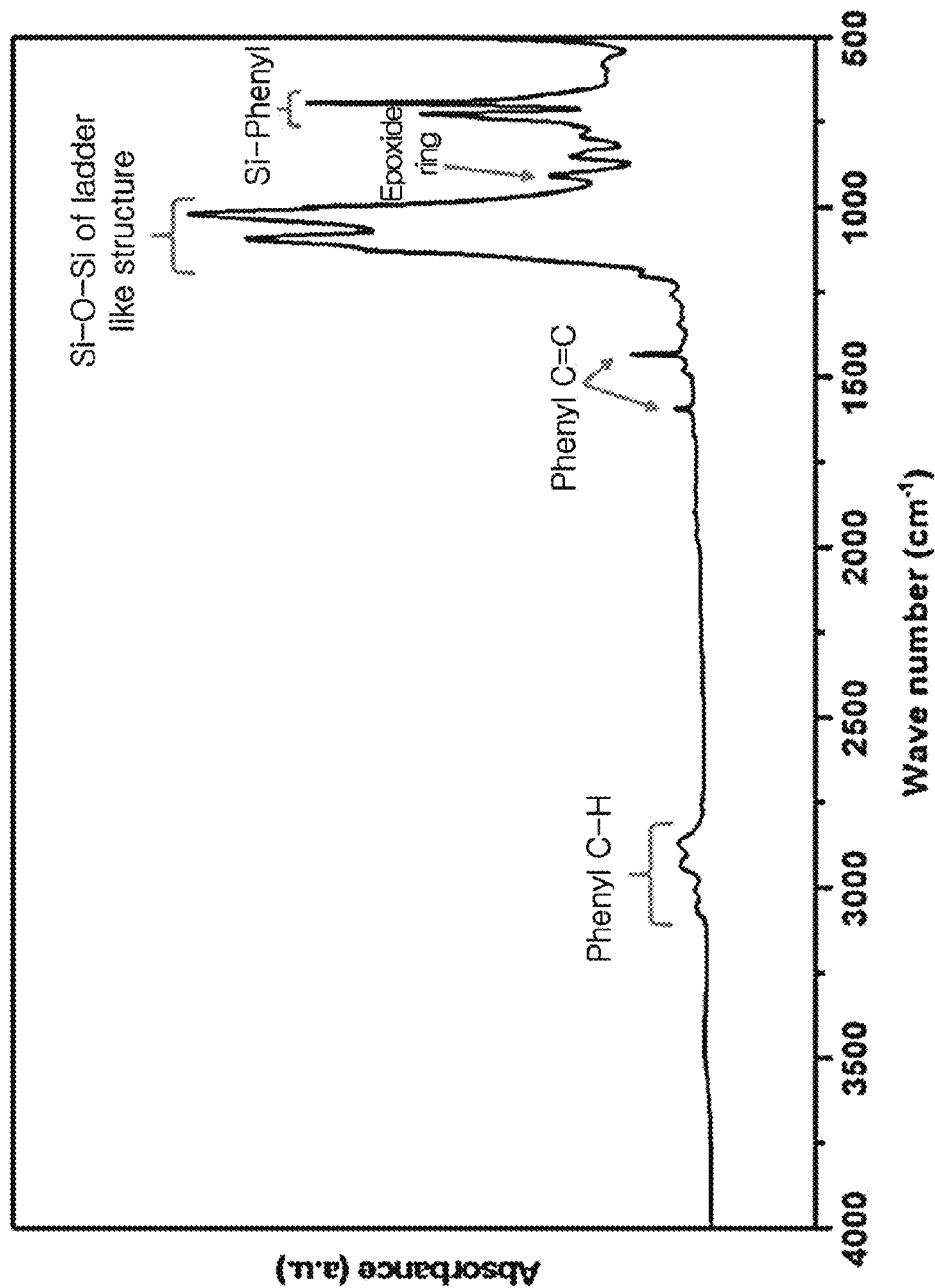
FIG. 3 shows an FT-IR measurement result of a PSSQ according to an exemplary embodiment of the present disclosure.

FIG. 3 shows the FT-IR measurement result of the PSSQ prepared in Example 1. From FIG. 3, the presence of the characteristic peaks corresponding to the epoxide group (908 cm$^{-1}$), the phenyl group (2800-3100, 1594, 1430 cm$^{-1}$) and the backbone (1020, 1090 cm$^{-1}$) of the ladder-structured PSSQ can be identified.

Figures 4A, 4B, 4C:
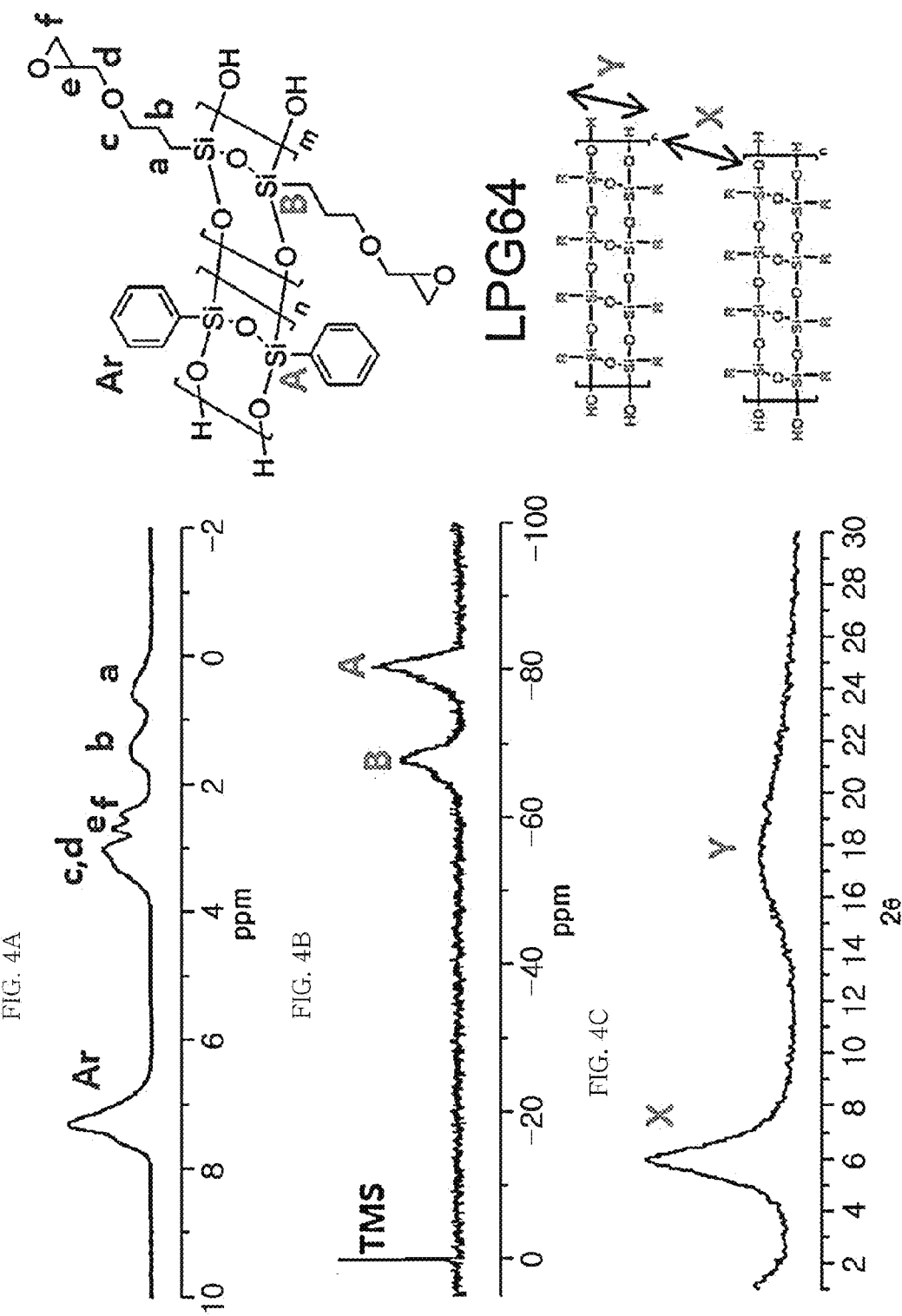
FIGS. 4A to 4C show (a) $^1H$ NMR, (b) $^{29}Si$ NMR and (c) WAXD results of a PSSQ according to an exemplary embodiment of the present disclosure.

FIGS. 4A to 4C show (a) $^1$H NMR, (b) $^{29}$Si NMR and (c) WAXD results of the PSSQ prepared in Example 1. From the $^1$H NMR analysis result (a) of FIG. 4A, it can be seen that the characteristic peaks corresponding to the methoxy group (3.55 ppm) and the silanol group (5.0 ppm) disappeared, which suggests that condensation occurred after the methoxy group had been completely hydrolyzed. The relative peak ratio of the PTMS and GPTMS groups corresponds to the mixing ratio (monomer feed ratio) of the PTMS and the GPTMS. The broad peaks corresponding to aliphatic and aromatic protons imply a high molecular weight, which is in agreement with the GPC result (Mw: 44K, PDI: 1.9).

The siloxane structure and the degree of condensation can be identified from the $^{29}$Si NMR result (b) of FIG. 4B. The characteristic peaks corresponding to the T$^3$ (Ph-Si(OSi—)$_3$) and T$^2$ (Ph-Si(OSi—)$_2$OH) structures are observed at −78 ppm and −70 ppm, respectively, and the peaks corresponding to the glycidoxypropyl epoxy-centered silicon T$^3$ (alkyl-Si(OSi—)$_3$) and T$^2$ (alkyl-Si(OSi—)$_2$OH) are observed at −68 ppm and −58 ppm. Also, as seen from FIG. 4B, the presence of only the (Ph-Si(OSi—)$_3$) and (alkyl-Si(OSi—)$_3$) T$^3$ peaks means that the siloxane structure was completely condensed. In addition, in contrast to the overlapping of the (alkyl-Si(OSi—)$_3$) T$^3$ and the (Ph-Si(OSi—)$_3$) T$^2$ peaks, the integrated ratio of the (Ph-Si(OSi—)$_3$) T$^3$ and (alkyl-Si (OSi—)$_3$) T$^2$ peaks reflects the high initial copolymerization molar feed ratio confirmed through the $^1$H NMR analysis. This suggests that the siloxane structure was formed through high degree of condensation.

Further, XRD measurement was carried out for bulk structure analysis of LPG64 (see FIG. 4C). The PSSQ material with a high molecular weight was comparable to an amorphous polymer and had a peak corresponding to the intramolecular periodic chain-to-chain distance at 6° ('X' in FIG. 4C) and a peak corresponding to the average thickness of the siloxane structure (Si—O—Si) at 18° ('Y' in FIG. 4C). From the WAXD result (c) in FIG. 4C, it was confirmed that the LPG64-based ladder-structured PSSQ prepared in Example 1 had an average thickness of 4.5 Å and an intramolecular periodic chain-to-chain distance of 13.3 Å.

Example 4: Characterization of LPG64/OAPS-Based Gas Separation Membranes

Figure 2A:
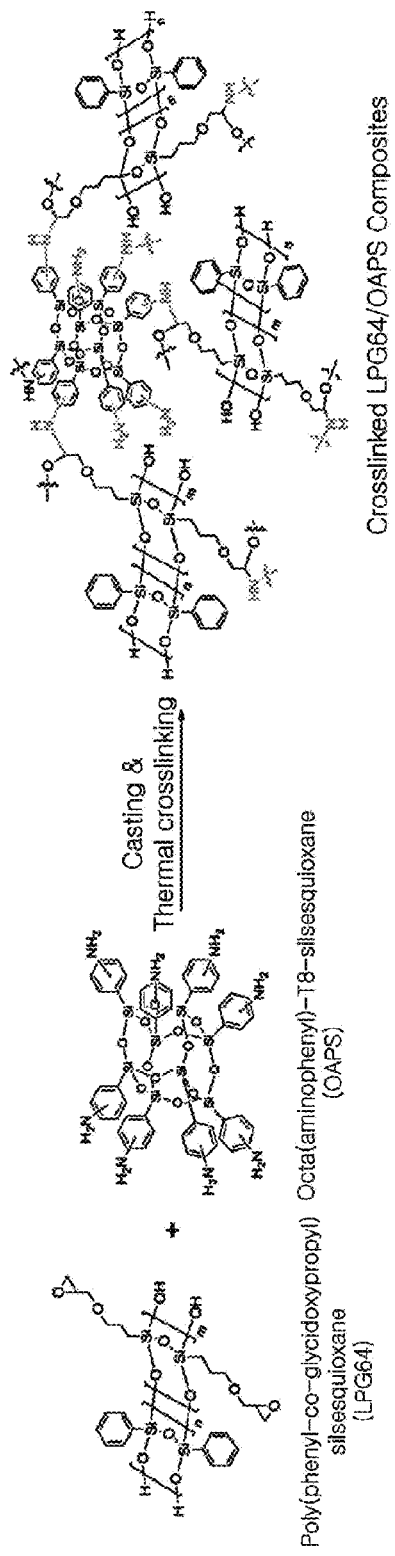
FIGS. 2A and 2B describe a method for fabricating a ladder-structured PSSQ- and OAPS-based gas separation membrane according to an exemplary embodiment of the present disclosure.
Figure 2B:
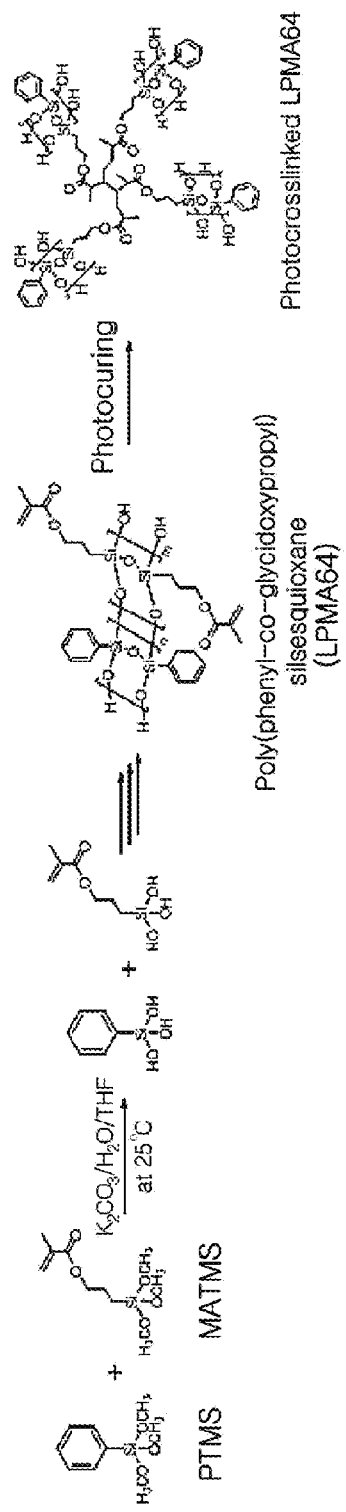

As schematically described in FIGS. 2A and 2B, the epoxy ring group of a ladder-structured PSSQ and the amine group of OAPS can be thermally crosslinked. To determine the condition of thermal crosslinking of LPG64 and OAPS, LPG64 was mixed with 10 wt % or 20 wt % of OAPS to prepare a gas separation membrane (LPG64/OAPS-based gas separation membrane of Example 2) and differential scanning calorimetric (DSC) analysis was carried out.

Figure 5:
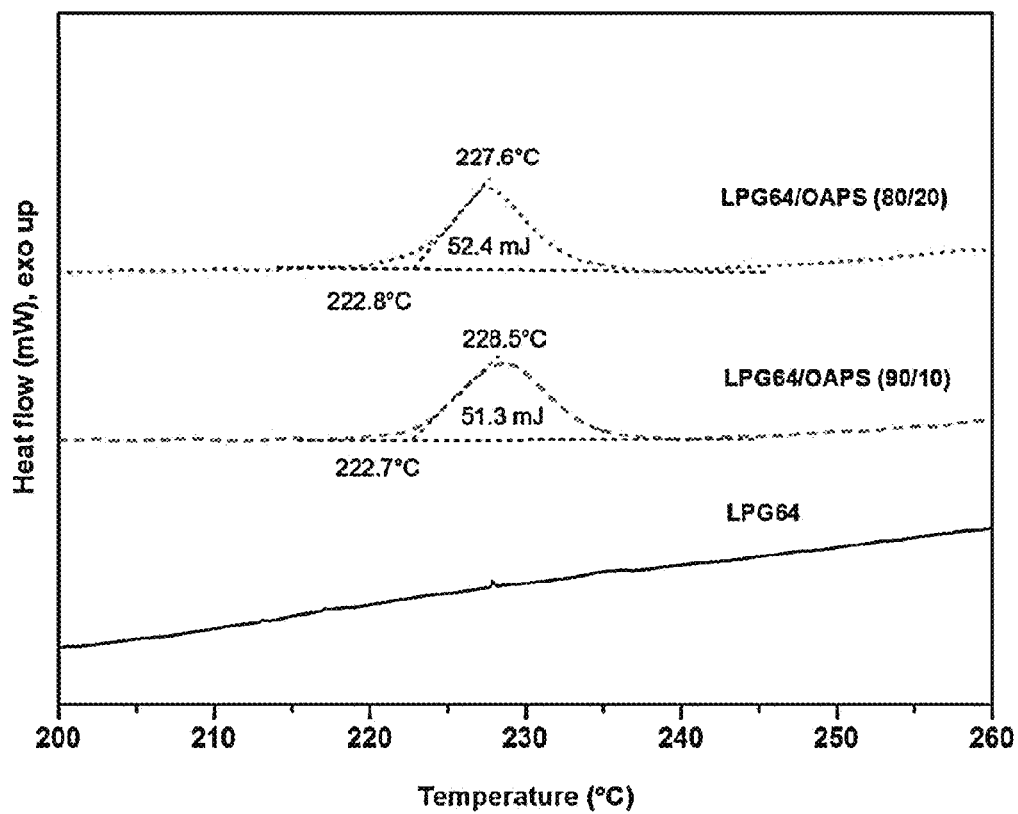
FIG. 5 shows a DSC analysis result of an LPG64-based gas separation membrane and uncrosslinked LPG64/OAPS-based gas separation membranes (90/10, 80/20; wt/wt) according to an exemplary embodiment of the present disclosure.

FIG. 5 shows the DSC analysis result of the LPG64-based gas separation membrane and the uncrosslinked LPG64/OAPS-based gas separation membranes (90/10, 80/20). Referring to FIG. 5, the LPG64 having high molecular weight and synthesized through high degree of condensation showed no glass transition temperature (T$_g$) between 30 and 300° C. due to the rigid siloxane structure. This is contrasted with the PSSQ which has many uncondensed Si—OH groups and shows a glass transition temperature. The LPG64/OAPS-based gas separation membranes (90/10, 80/20) showed broad exothermal peaks between 220 and 240° C., which demonstrates that crosslinking occurred between the epoxy group of the LPG64 and the amine group of the OAPS. Based on this DSC analysis result, the reaction temperature for thermal crosslinking of LPG64 and OAPS can be determined at around 250° C.

Figure 6A:
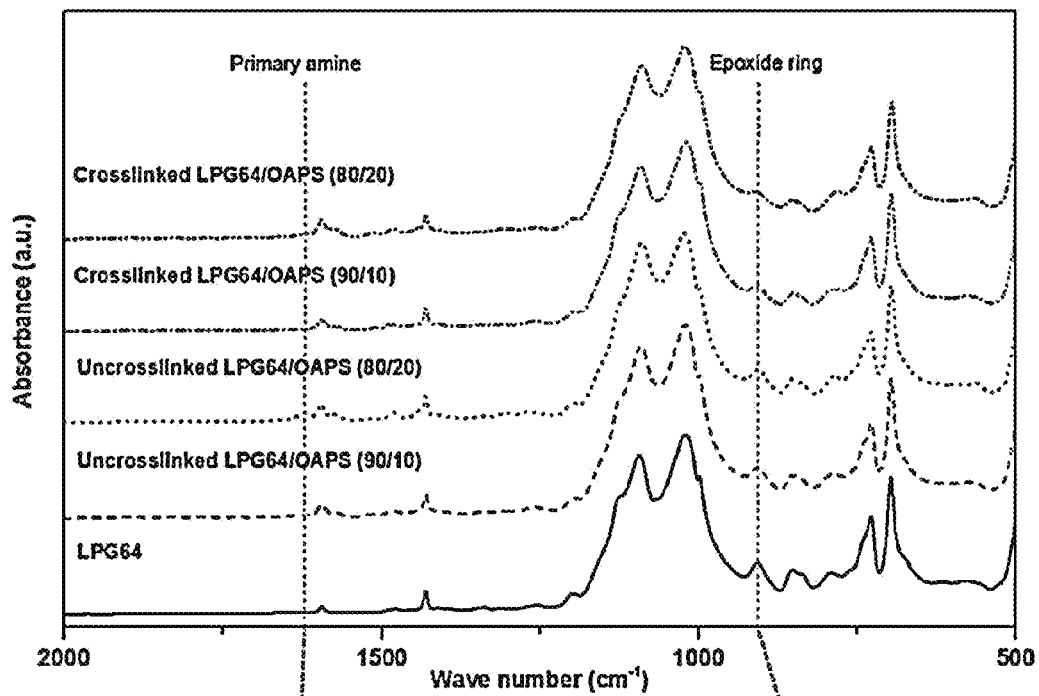
FIGS. 6A to 6C show an FT-IR analysis result of an LPG64-based gas separation membrane, uncrosslinked LPG64/OAPS-based gas separation membranes and crosslinked LPG64/OAPS-based gas separation membranes according to an exemplary embodiment of the present disclosure.
Figure 6B:
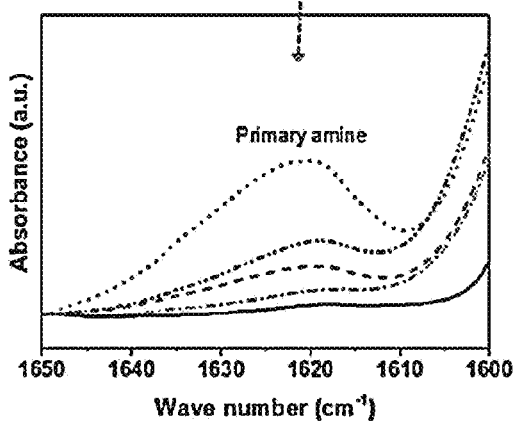
Figure 6C:
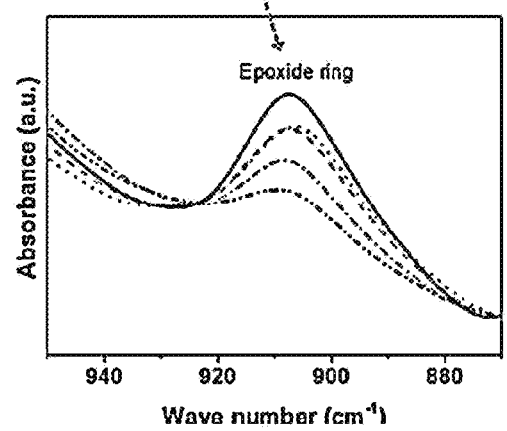

FIGS. 6A to 6C shows the FT-IR analysis result of the LPG64-based gas separation membrane, the uncrosslinked LPG64/OAPS-based gas separation membranes and the crosslinked LPG64/OAPS-based gas separation membranes. Referring to FIGS. 6A to 6C, the uncrosslinked LPG64/OAPS-based gas separation membranes (90/10, 80/20) show small peaks corresponding to primary amines at 1620 cm$^{-1}$. The peak intensity increased with the concentration of the OAPS. In contrast, the crosslinked LPG64/OAPS separation membranes (90/10, 80/20) showed decrease characteristic peaks of epoxide ring groups at 908 cm$^{-1}$ and primary amine groups at 1620 cm$^{-1}$, which confirms that thermal crosslinking occurred. In particular, the crosslinked LPG64/OAPS-based gas separation membranes (80/20) showed more decreased intensity of the epoxy group peak, which suggests a higher degree of crosslinking for the LPG64/OAPS (80/20). Whereas the crosslinked LPG64/OAPS (90/10) show few primary amine peaks (e.g., at 1620 cm$^{-1}$), they appeared again for the crosslinked LPT64/OAPS (80/20). This suggests that the crosslinked LPG64/OAPS (80/20) was not fully crosslinked. From the fact that the molar ratio of the primary amine of the OAPS and the epoxy group of the LPG64 was 0.28 and 0.63, respectively, for the crosslinked LPG64/OAPS (90/10) and LPG64/OAPS (80/20) gas separation membranes, it can be inferred that there is structural limitation in crosslinking due to the steric hindrance of the bulk OAPS.

Figure 7A:
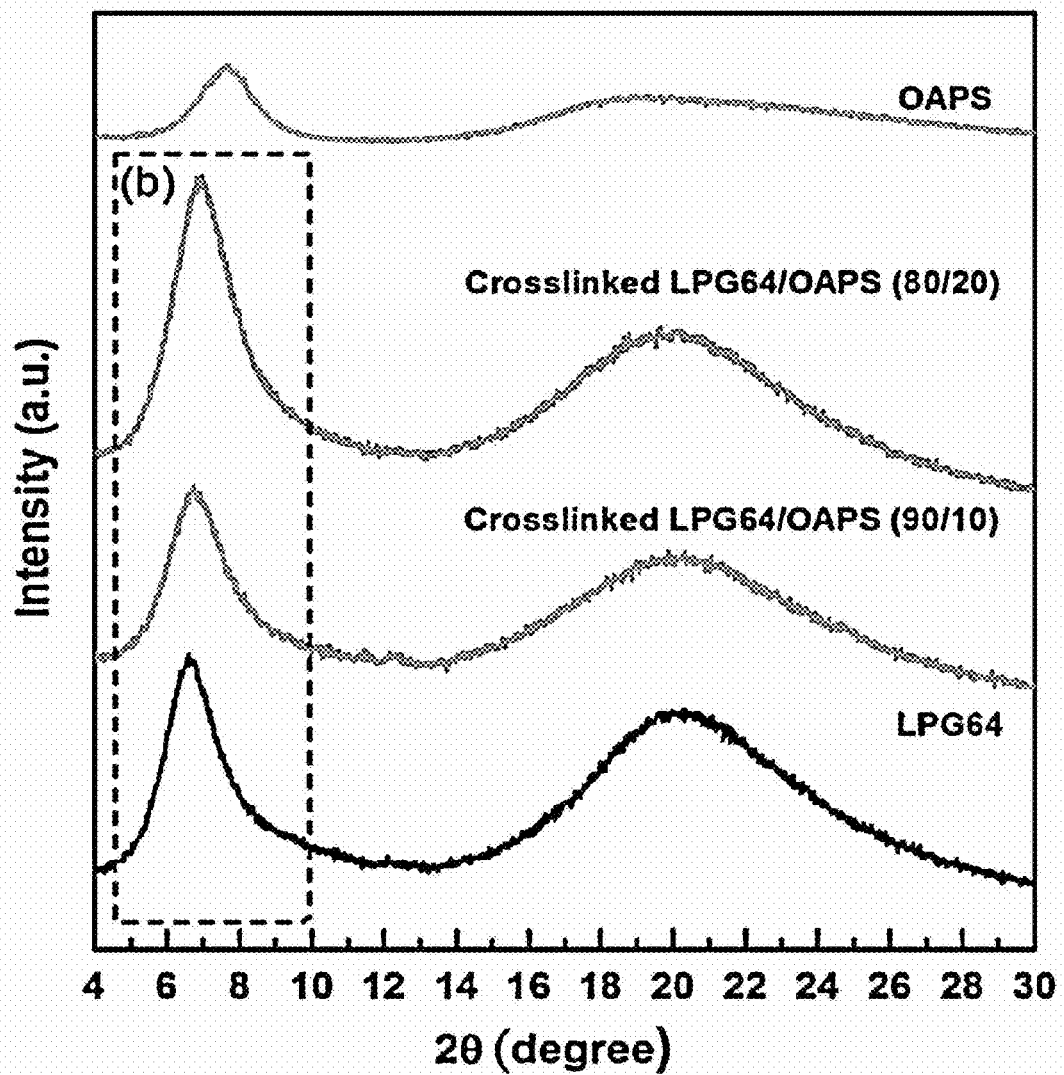
FIGS. 7A and 7B show an XRD analysis result of an LPG64-based gas separation membranes, crosslinked LPG64/OAPS-based gas separation membranes and an OAPS powder according to an exemplary embodiment of the present disclosure.
Figure 7B:
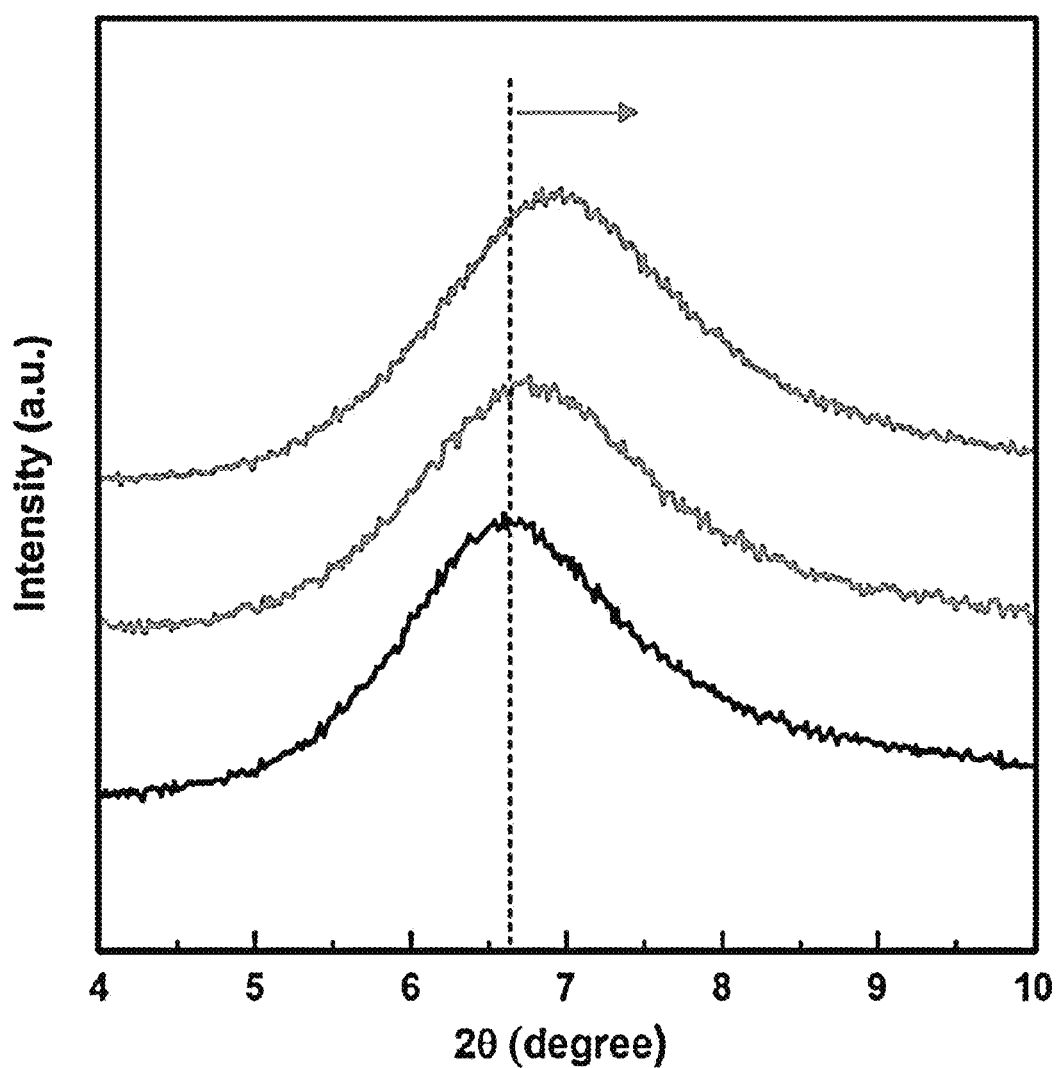

Also, the effect of the OAPS on the microstructure of the LPG64 was analyzed. XRD analysis was carried out for the LPG64-based gas separation membrane, the crosslinked LPG64/OAPS-based gas separation membranes and OAPS powder (see FIGS. 7A and 7B). Referring to FIGS. 7A and 7B, the XRD pattern of OAPS showed a peak corresponding to the diameter (11.5 Å) of the cubic OAPS at 7.7° as well as a broad peak corresponding to the substitutional isomers of aromatic amines at 19°. As the concentration of the OAPS increased, the characteristic peak of LPG64 at 6.7° was shifted to 7°, which suggests the decrease of d-spacing from 13.4 Å to 12.7 Å. This result means that the crosslinking by the OAPS leads to decreased intramolecular periodic chain-to-chain distance of LPG64 and increased chain packing density within the LPG64.

Figure 8:
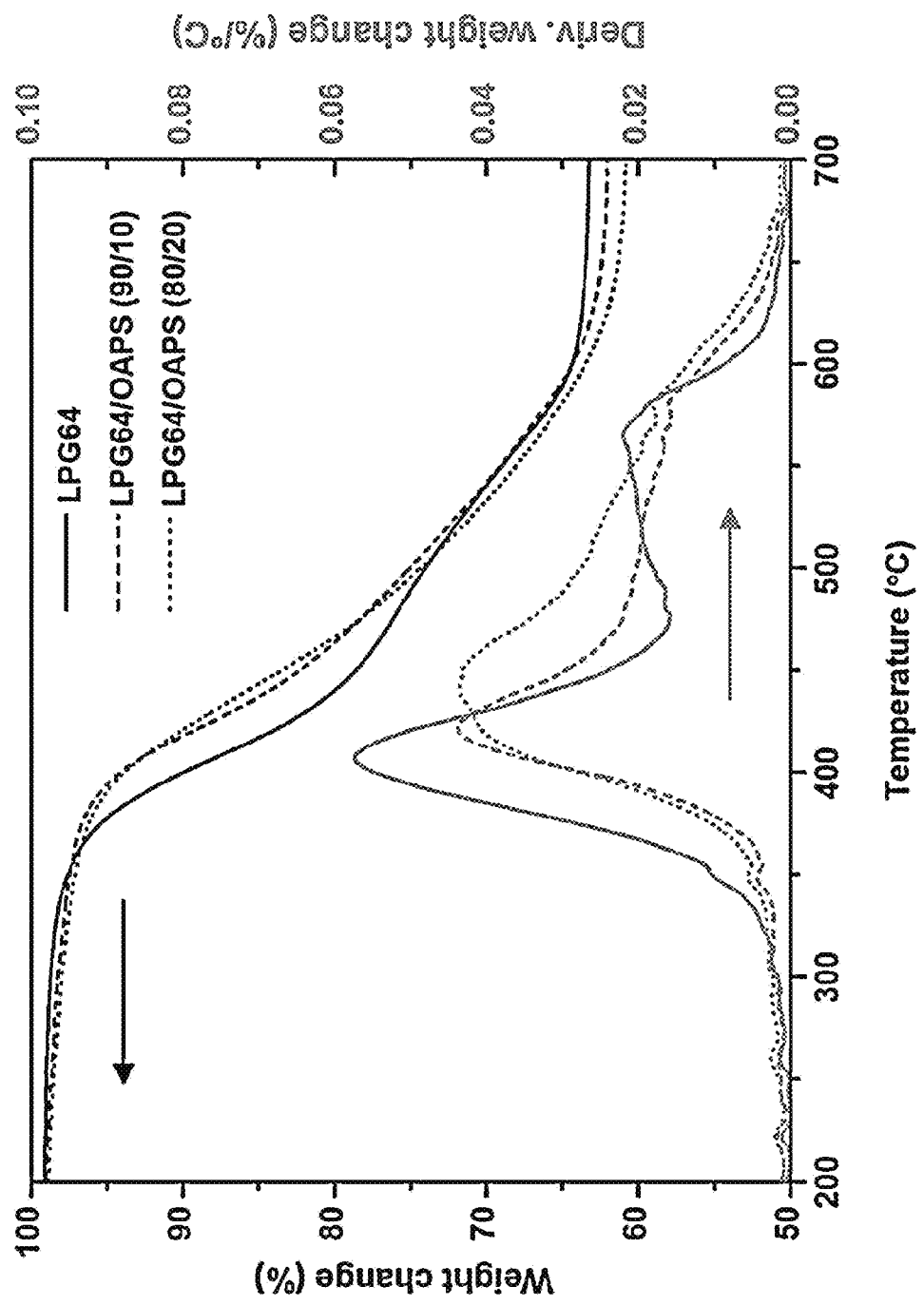
FIG. 8 shows a TGA analysis result of an LPG64-based gas separation membrane and crosslinked LPG64/OAPS-based gas separation membranes according to an exemplary embodiment of the present disclosure.

Example 5: Analysis of Thermal and Physical Properties of LPG64-Based Gas Separation Membrane and Crosslinked LPG64/OAPS-Based Gas Separation Membranes The thermal degradation properties of the LPG64-based gas separation membrane and the crosslinked LPG64/OAPS-based gas separation membranes under nitrogen atmosphere were analyzed by thermogravimetric analysis (TGA). FIG. 8 shows the TGA analysis result of the LPG64-based gas separation membrane and the crosslinked LPG64/OAPS-based gas separation membranes and Table 2 shows the thermal degradation temperature of the LPG64-based gas separation membrane and the crosslinked LPG64/OAPS-based gas separation membranes on 5% and 10% weight loss.

TABLE 2

Thermal degradation temperature of LPG64-based gas separation membrane and crosslinked LPG64/OAPS-based gas separation membranes on 5% and 10% weight loss

|  | $T_d$ (° C.), 5% weight loss | $T_d$ (° C.), 10% weight loss |
| --- | --- | --- |
| LPG64 | 380 | 401 |
| LPG64/OAPS (90/10) | 398 | 420 |
| LPG64/OAPS (80/20) | 397 | 424 |

From the derivative thermogravimetric curve of the LPG64 gas separation membrane in FIG. 8, it can be seen that the LPG64 gas separation membrane shows two characteristic peaks during thermal degradation, which correspond to the thermal degradation of GPTMS and PTMS. Considering that the aromatic structure is relatively rigid and thermally stable in general, it may be conjectured that the GPTMS and the PTMS will be thermally degraded in sequence. Also, it can be seen that the crosslinked LPG64/OAPS-based gas separation membranes showed higher thermal degradation temperatures ($T_d$) than the LPG64.

Figure 9:
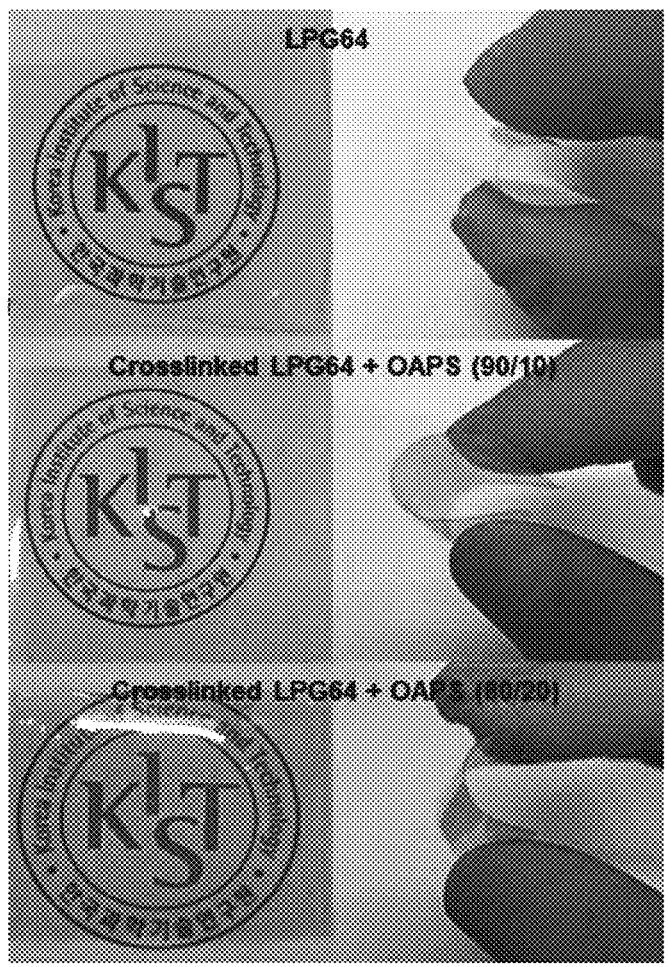
FIG. 9 shows images of an LPG64-based gas separation membrane and crosslinked LPG64/OAPS-based gas separation membranes according to an exemplary embodiment of the present disclosure.
Figure 10A:
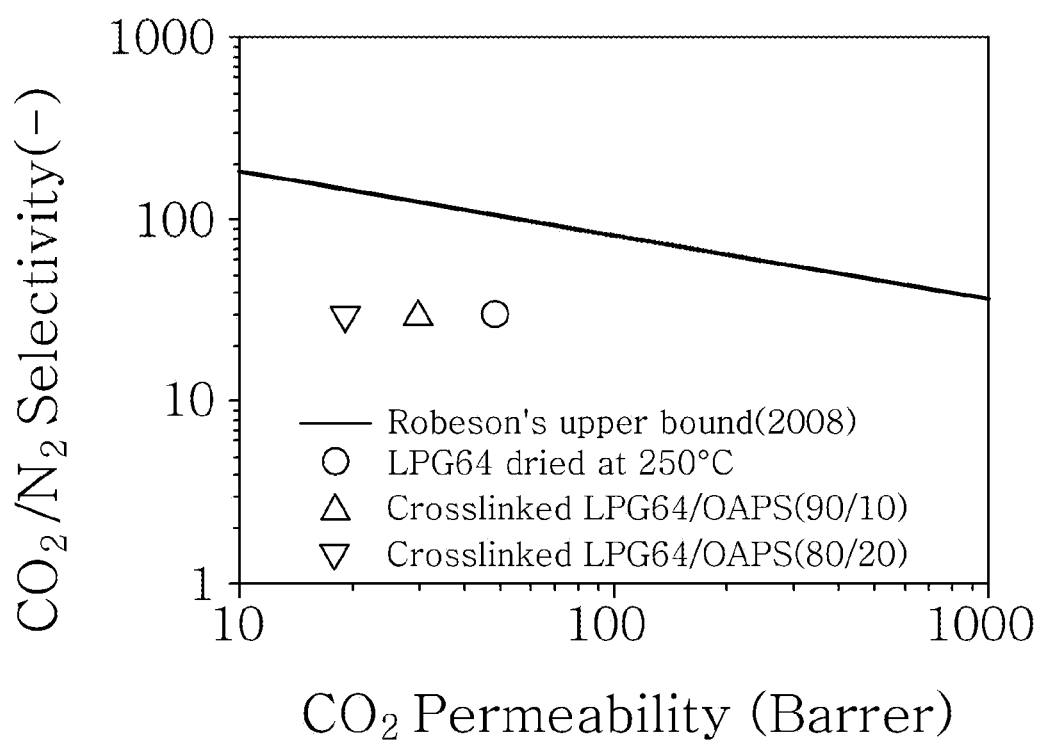
FIGS. 10A to 10E show single gas separation performance of an LPG64-based gas separation membrane and crosslinked LPG64/OAPS-based gas separation membranes (90/10, 80/20) according to an exemplary embodiment of the present disclosure.
Figure 10B:
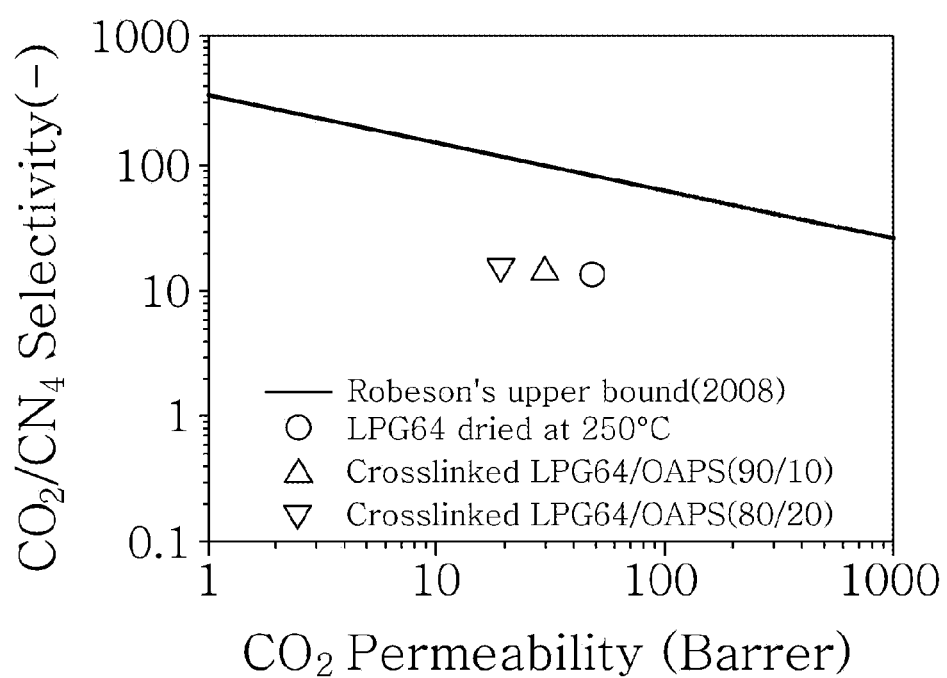
Figure 10C:
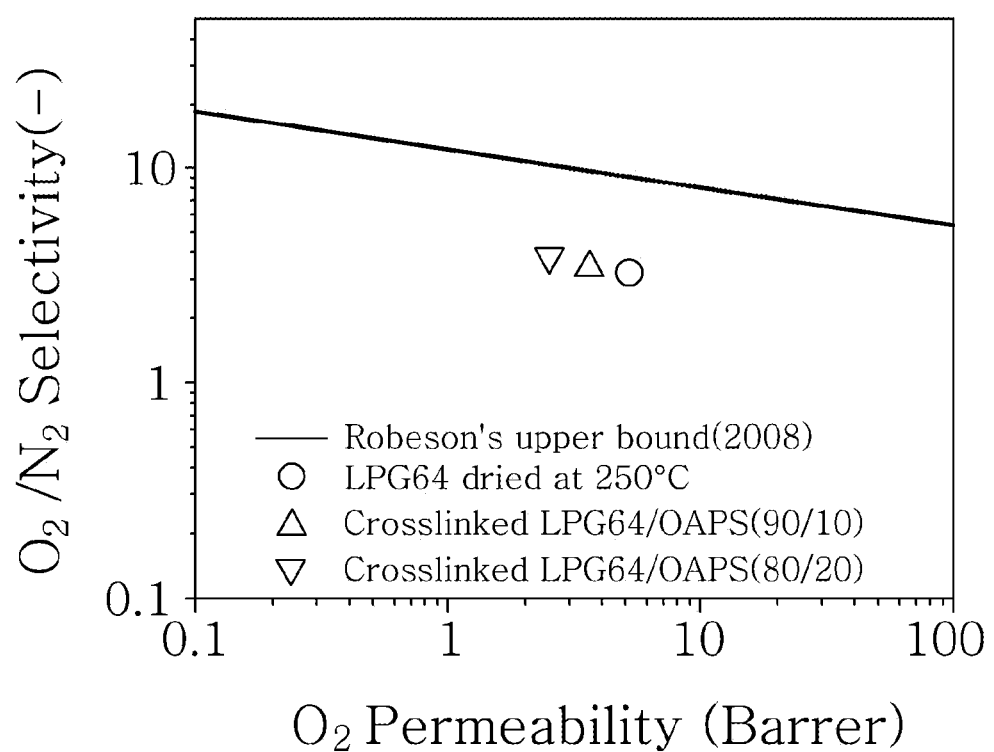
Figure 10D:
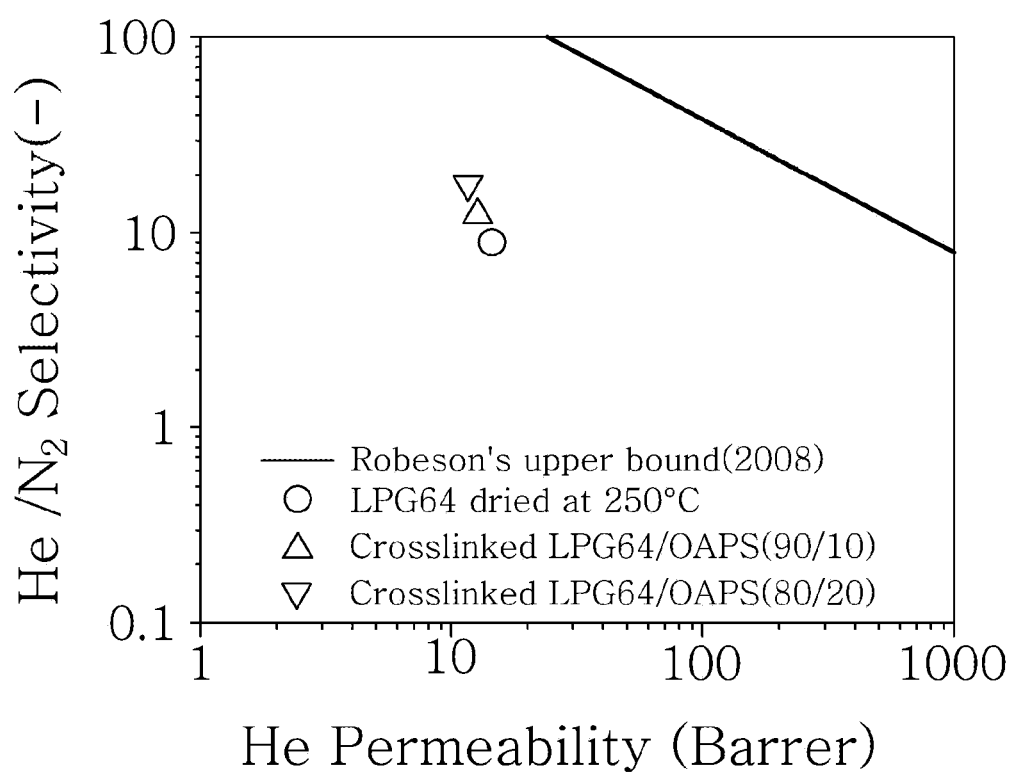
Figure 10E:
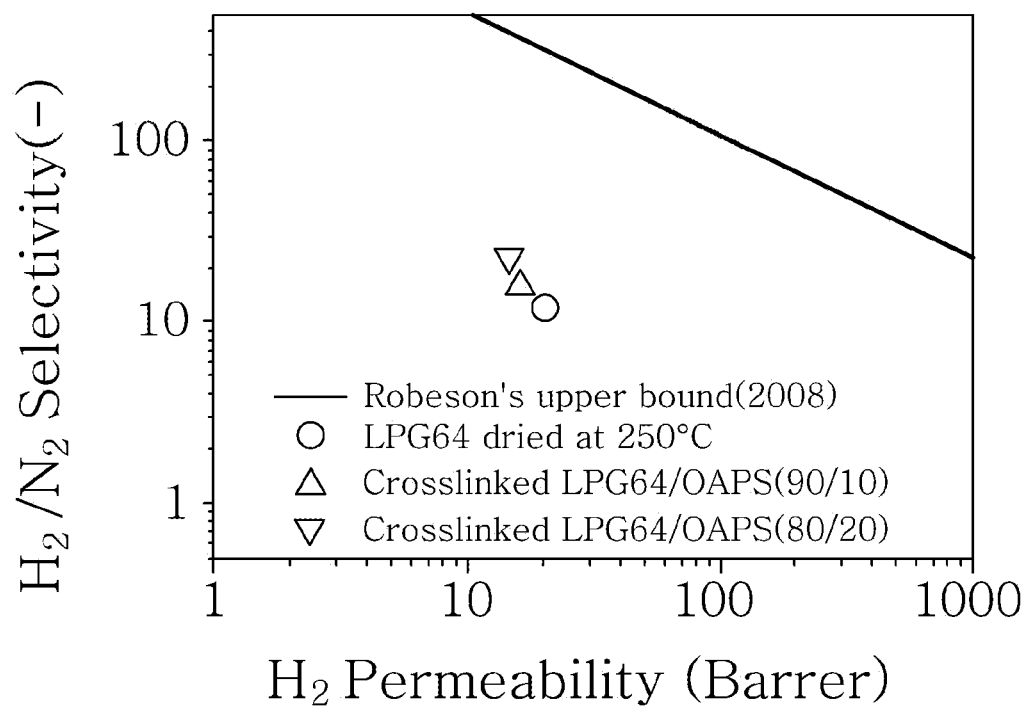
Figure 11A:
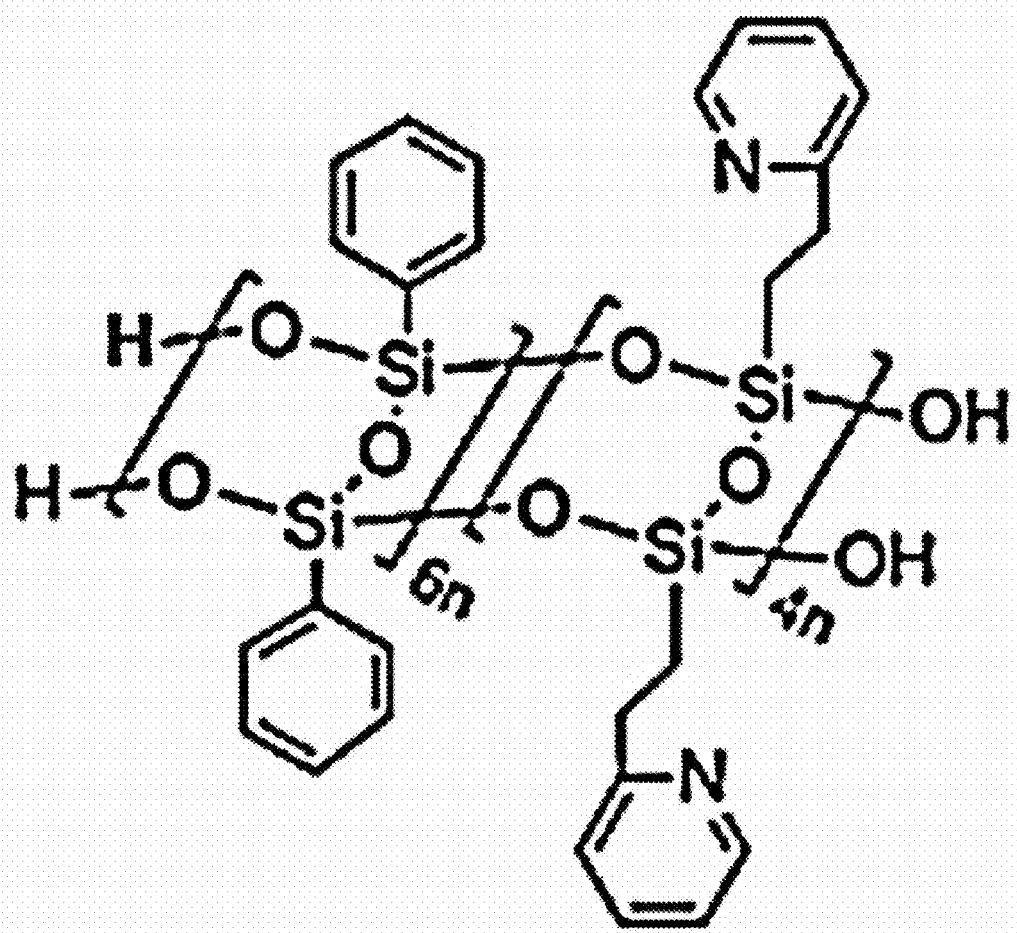
FIGS. 11A to 11E show ladder-structured polysilsesquioxanes used in a gas separation membrane according to an exemplary embodiment of the present disclosure.
Figure 11B:
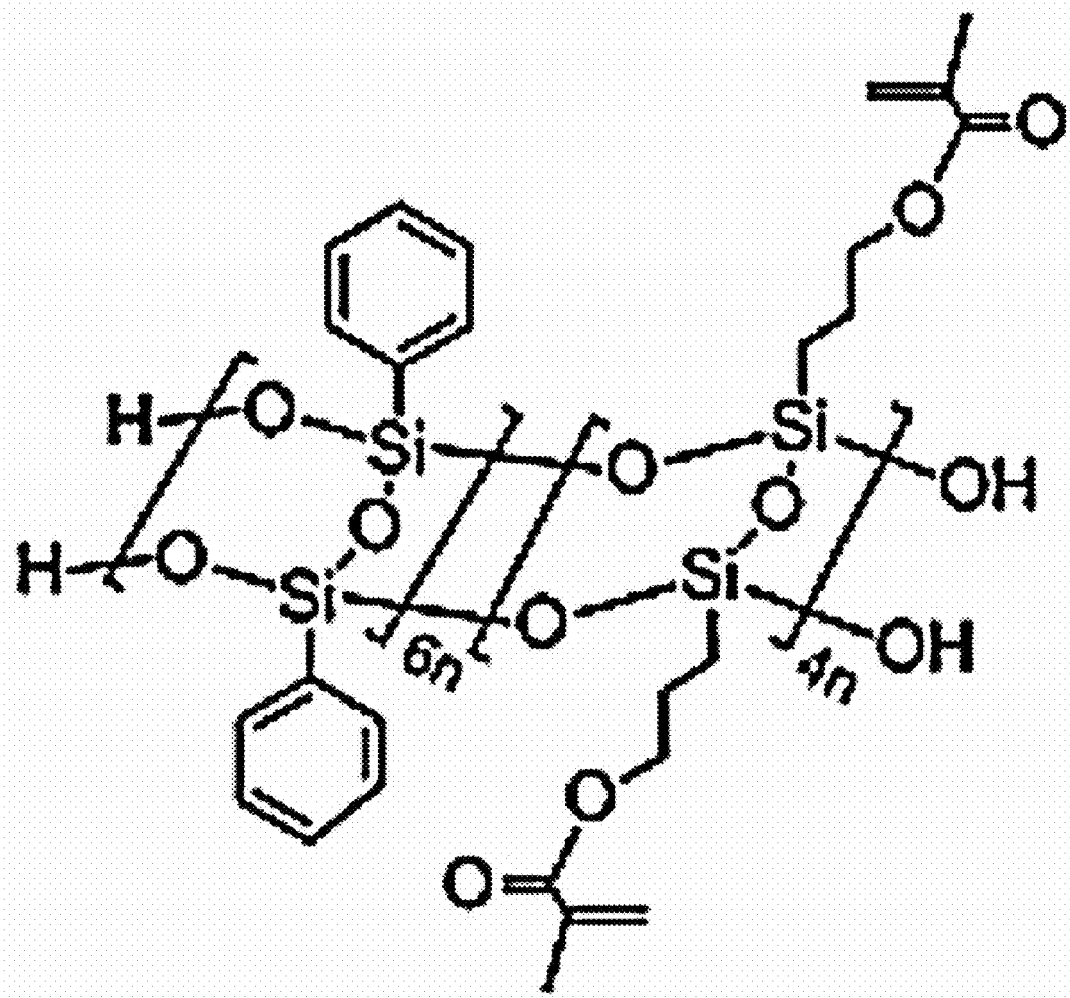
Figure 11C:
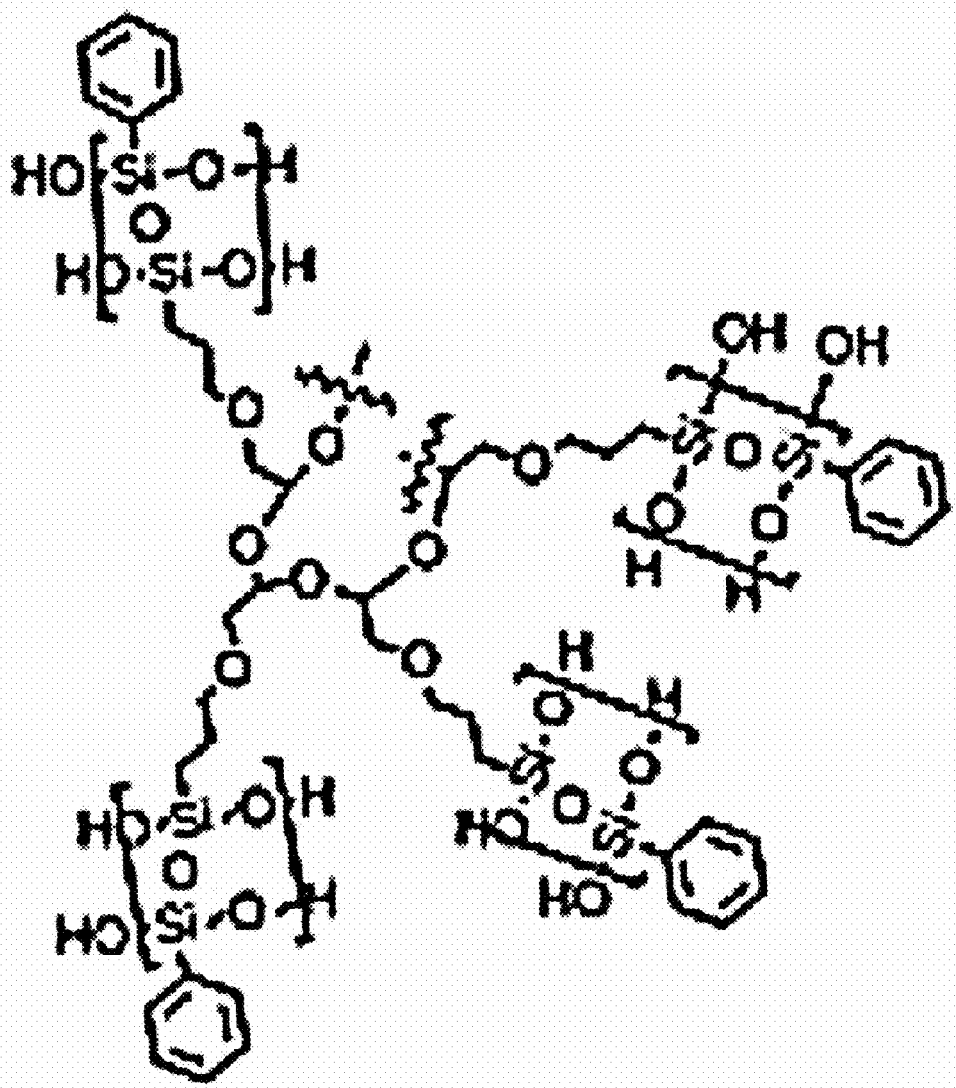
Figure 11D:
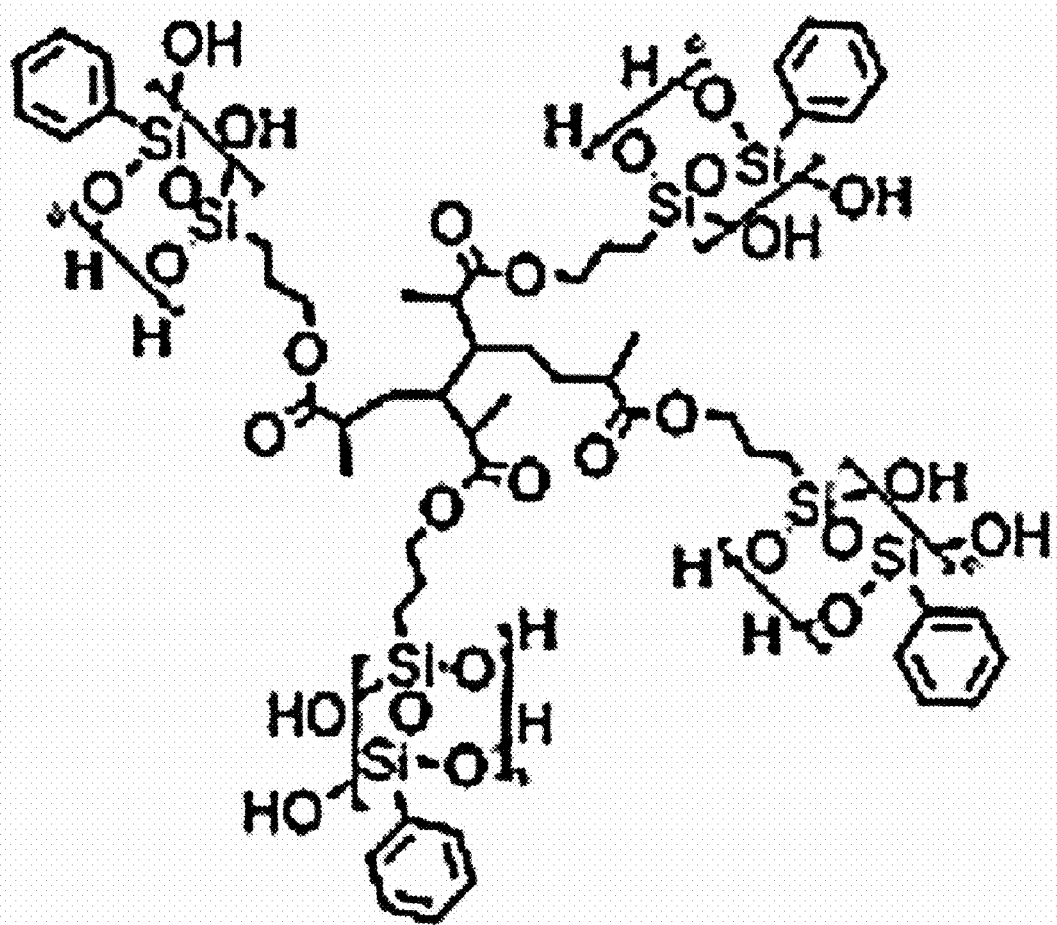
Figure 11E:
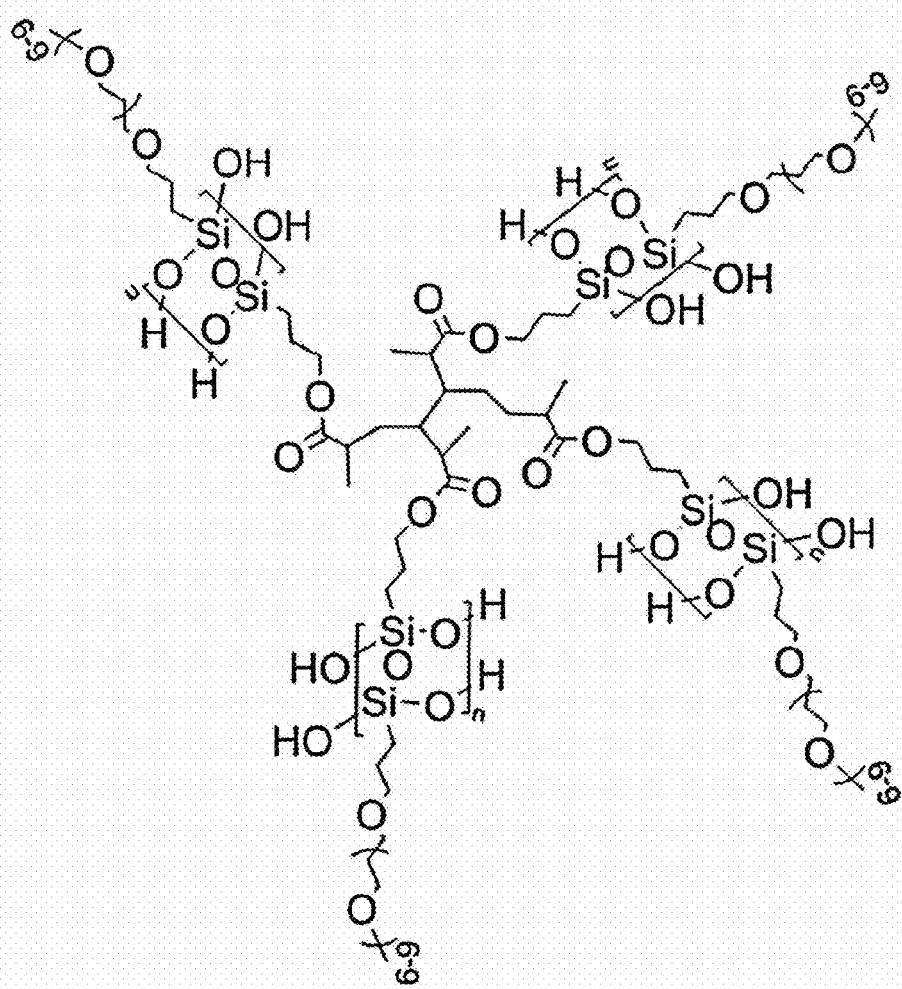

FIG. 9 shows the images of the LPG64-based gas separation membrane and the crosslinked LPG64/OAPS-based gas separation membranes fabricated in Example 2 (top: LPG64-based gas separation membrane, middle: crosslinked LPG64/OAPS-based gas separation membrane (90/10), bottom: crosslinked LPG64/OAPS-based gas separation membrane (80/20). In FIG. 9, the left-side images show the 100-μm thick gas separation membranes placed on the 'KIST' logo and the right-side images show bent gas separation membranes. Referring to FIG. 9, it can be seen that, although the gas separation membranes become gradually yellow with increased concentration of OAPS (from top to bottom) due to the amine groups of the OAPS, all the gas separation membranes are transparent. This means that a uniform phase was formed with no aggregation during the mixing of the LPG64 and the OAPS. Also, it can be seen that, whereas the PSSQ is brittle in general due to the rigid structure of siloxane, the gas separation membranes fabricated according to the present disclosure show flexibility owing to the flexible GPTMS and require no additional support.

Example 6: Analysis of Gas Separation Properties of LPG64-Based Gas Separation Membrane and Crosslinked LPG64/OAPS-Based Gas Separation Membranes The permeability of the LPG64-based gas separation membrane and the crosslinked LPG64/OAPS-based gas separation membranes fabricated in Example 2 was tested using an isochoric permeability analyzer. Specifically, the permeability was tested for a single gas (He, $H_2$, $CO_2$, $O_2$, $N_2$ and $CH_4$) at 1 atm and 35° C. The permeability and selectivity for each gas are summarized in Table 3.

LPG64 has a structure wherein short organic functional groups are attached to the siloxane chain (Si—O—Si). This material is comparable to polymers despite the structural difference from the existing glassy polymers due to the presence of the short organic functional groups attached to the long siloxane structure with a large molecular weight. In general, heat treatment of the glassy polymer below its glass transition temperature results in decreased permeability due to accelerated physical aging.

In order to investigate the change in the gas separation property of LPG64 after heat treatment, the LPG64-based gas separation membrane was heat-treated at 100° C. and 200° C. for 24 hours, respectively, and permeability was measured. As a result, the gas separation membranes heat-treated at the two temperatures showed similar permeability and selectivity. Based on this result, it can be seen that the heat treatment of the LPG64-based gas separation membrane has insignificant effect on its gas separation property. This may be because, despite the heat treatment, the rigid structure of the siloxane chain constituting the long backbone reduces chain packing.

As summarized in Table 3, all the gas separation membranes (LPG64-based gas separation membrane and crosslinked LPG64/OAPS-based gas separation membranes (90/10, 80/10)) showed permeabilities in the order of $CO_2 > H_2 > He > O_2 > CH_4 > N_2$. In general, a glassy polymer shows higher He permeability than $CO_2$ permeability. The permeability pattern of the LPG64 gas separation membrane coincided with those of polymers of intrinsic microporosity (PIMs). In particular, the LPG64 gas separation membrane showed relatively higher $CO_2$ permeability (47.88 Barrer) as compared to other gas molecules and the $CO_2/N_2$ selectivity was also relatively high as 30.5.

As the concentration of the OAPS was increased, permeability was decreased and selectivity was increased for nearly all the gases. As a whole, the decrease in the permeability was higher for larger gas molecules. The decrease of permeability with the OAPS concentration is largely due to the chain packing caused by the OAPS, as demonstrated by the XRD result described above. From this result, it is thought that the addition of OAPS results in decreased permeability and the gas molecules pass through the LPG64-based gas separation membrane via the solution-diffusion mechanism using the organic functional groups attached to the siloxane structure. Also, it can be thought that the restricted motion of the chains due to the crosslinking between LPG64 and OAPS leads to decreased permeability. In addition, the chain rigidification by the silica particles of the OAPS may lead to decreased permeability.

Example 7: Separation Performance

In order to visualize the potential of the LPG64 and thermally crosslinked LPG64/OAPS (90/10, 80/20 t) membranes as gas separation membrane materials, their separation performance for several gas pairs is shown in the most recent upper bound plots (see FIGS. 10A to 10E).

TABLE 3

Gas permeability and selectivity of LPG64-based gas separation membrane and crosslinked LPG64/OAPS-based gas separation membranes

| Sample | Gas Permeability (P, Barrer) | | | | | | Permselectivity (−) | | | | |
|---|---|---|---|---|---|---|---|---|---|---|---|
| | $P_{He}$ | $P_{H2}$ | $P_{CO_2}$ | $P_{O_2}$ | $P_{N_2}$ | $P_{CH_4}$ | $CO_3/N_2$ | $CO_3/CH_4$ | $O_2/N_2$ | $He/N_2$ | $H_2/N_2$ |
| LPG64 (dried at 250° C.) | 14.25 ± 0.42 | 19.91 ± 1.03 | 47.88 ± 2.26 | 5.13 ± 0.23 | 1.57 ± 0.06 | 3.59 ± 0.18 | 30.5 | 13.3 | 3.3 | 9.1 | 12.2 |
| Crosslinked LPG64/OAPS (90/10) | 12.66 ± 1.03 | 16.10 ± 0.12 | 29.78 ± 0.30 | 3.57 ± 0.08 | 1.01 ± 0.02 | 2.17 ± 0.02 | 29.6 | 13.8 | 3.5 | 12.6 | 16.0 |
| Crosslinked LPG64/OAPS (80/20) | 11.44 ± 0.80 | 14.52 ± 0.02 | 19.08 ± 0.86 | 2.49 ± 0.18 | 0.64 ± 0.06 | 1.23 ± 0.11 | 30.0 | 15.6 | 3.9 | 18.0 | 22.9 |

Table 4 summarizes the diffusivity (apparent diffusivity) and solubility of the LPG64-based gas separation membrane and the crosslinked LPG64/OAPS-based gas separation membranes fabricated in Example 2. Referring to Table 4, the gas separation membranes show higher diffusivity than glassy polymer gas separation membranes and similar diffusivity as polymers of intrinsic microporosity (PIMs) for most gases. This may be because, since the organic functional groups of LPG64 are covalently bonded to the ladder-structured backbone, i.e., the siloxane chain, having an intramolecular periodic chain-to-chain distance of 13.3 Å, the motion of the organic functional groups is partially restricted. Meanwhile, the solubility of the gas separation membranes of the present disclosure is 10-100 times lower than that of the PIMs, possibly due to the relatively fewer microspores owing to the long and flexible GPTMS chains of the LPG64 unlike the PIMs having a rigid structure. In addition, the solubility decreased in the order of $He<H_2<O_2<N_2<CO_2<CH_4$ with the OAPS concentration. Except $CO_2$, the decrease in solubility coincided with the increased size of gas molecules.

Example 8: Separation Performance

The chemical structures of additional ladder-type structured polysilsesquioxanes (PSSQs) are shown in FIGS. 11A to 11E.

Single gas measurements (i.e. He, $H_2$, $CO_2$, $O_2$, $N_2$, $CH_4$) in ladder-type structured PSSQ membranes with different organic functional groups including poly(phenyl-co-methacryloxypropyl)silsesquioxane (LPMA64), poly(phenyl-co-2-pyridylethyl)silsesquioxane (LPPyr64), poly(oliogoethyleneoxide-co-methacryloxypropyl)silsesquioxane (LPPEOMA64) were performed at 1 atm and 35° C. The permeabilities of each gas in those three PSSQ membranes are summarized in Table 5 below. Also, permeation results for UV-crosslinked LPG64 and LPMA64 membranes are presented in Table 5. Especially, $CO_2/H_2$ and $CO_2/N_2$ separation performances for all these PSSQ membranes are compared in the most recent upper bounds (see FIGS. 12A and 12B).

TABLE 4

Diffusivity and solubility of LPG64-based gas separation membrane and crosslinked LPG64/OAPS-based gas separation membrane

| Sample | Diffusity (D, ×10$^7$ cm$^2$/s) | | | | | | Solubility (S, ×10$^2$ cc(STP)/cc poly/cmHg) | | | | | |
|---|---|---|---|---|---|---|---|---|---|---|---|---|
| | $D_{He}$ | $D_{H2}$ | $D_{CO_2}$ | $D_{O_2}$ | $D_{N_2}$ | $D_{CH_4}$ | $S_{He}$ | $S_{H2}$ | $S_{CO_2}$ | $S_{O_2}$ | $S_{N_2}$ | $S_{CH_4}$ |
| LPG64 (dried at 250° C.) | 87.60 ± 42.99 | 58.85 ± 13.51 | 3.51 ± 0.16 | 6.41 ± 0.05 | 4.74 ± 1.48 | 1.97 ± 0.17 | 0.02 ± 0.01 | 0.03 ± 0.01 | 1.37 ± 0.09 | 0.08 ± 0.004 | 0.03 ± 0.01 | 0.18 ± 0.02 |
| Crosslinked LPG64/OAPS (90/10) | 58.60 ± 3.68 | 26.85 ± 0.64 | 1.31 ± 0.07 | 2.55 ± 0.22 | 1.31 ± 0.16 | 0.54 ± 0.04 | 0.02 ± 0.001 | 0.06 ± 0.001 | 2.27 ± 0.13 | 0.14 ± 0.01 | 0.08 ± 0.01 | 0.40 ± 0.03 |
| Crosslinked LPG64/OAPS (80/20) | 54.30 ± 15.13 | 21.20 ± 1.13 | 0.58 ± 0.05 | 1.21 ± 0.12 | 0.61 ± 0.04 | 0.20 ± 0.01 | 0.02 ± 0.01 | 0.07 ± 0.004 | 3.31 ± 0.33 | 0.21 ± 0.03 | 0.11 ± 0.01 | 0.61 ± 0.06 |

TABLE 5

| | Permeability at 1 atm and 35° C. | | | | | |
|---|---|---|---|---|---|---|
| Gas | He | $H_2$ | $CO_2$ | $O_2$ | $N_2$ | $CH_4$ |
| LPMA64 | 27.23 ± 0.07 | 39.20 ± 0.01 | 103.12 ± 1.43 | 13.56 ± 0.04 | 4.43 ± 0.06 | 10.88 ± 0.03 |
| LPPyr64 | 14.53 ± 0.07 | 19.78 ± 0.01 | 34.19 ± 0.10 | 4.83 ± 0.02 | 1.28 ± 0.02 | 2.76 ± 0.03 |
| UV-crosslinked LPG64 | 9.73 ± 0.71 | 10.79 ± 0.57 | 12.07 ± 0.93 | 1.77 ± 0.13 | 0.42 ± 0.02 | 0.77 ± 0.04 |
| UV-crosslinked LPMA64 | 21.26 ± 0.73 | 27.70 ± 1.19 | 53.91 ± 2.11 | 7.54 ± 0.49 | 2.26 ± 0.17 | 4.98 ± 0.30 |
| UV-crosslinked LPPEOMA64 | 30.07 ± 0.07 | 47.27 ± 1.06 | 373.38 ± 1.98 | 22.45 ± 0.28 | 9.43 ± 0.43 | 28.50 ± 0.11 |

What is claimed is:

1. A gas separation membrane comprising a ladder-structured polysilsesquioxane with a photoinitiator photocured by irradiating UV.

2. The gas separation membrane according to claim 1, wherein the ladder-structured polysilsesquioxane comprises one or more crosslinkable organic functional group as a side chain.

3. The gas separation membrane according to claim 1, wherein the ladder-structured polysilsesquioxane is represented by Chemical Formula 1:

<Chemical Formula 1>

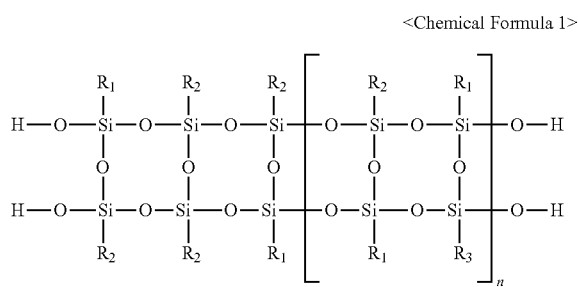

wherein each of $R_1$, $R_2$ and $R_3$ is independently selected from a group consisting of an alkyl group, an allyl group, an amine group, a halogen, an alkyl halogen, a vinyl group, an aryl group, a polyethylene oxide group, a methacryl group, an acryl group and an epoxy group and at least one of the $R_1$, the $R_2$ and the $R_3$ is a crosslinkable organic functional group selected from a group consisting of a vinyl group, an aryl group, a methacryl group, an acryl group and an epoxy group, and n is an integer from 1 to 10,000.

4. The gas separation membrane according to claim 1, wherein the photoinitiator is in an amount of 1-3 wt % based on the total weight of the mixture.

5. The gas separation membrane according to claim 1, wherein the photocuring is cationic photocuring or radical photocuring.

6. The gas separation membrane according to claim 1, wherein the ladder-structured polysilsesquioxane comprises an epoxy group and cationic photocuring occurs via ring-opening polymerization of the epoxy group under the UV irradiation.

7. A gas separation membrane comprising a ladder-structured polysilsesquioxane, which comprises the ladder-structured polysilsesquioxane with a photoinitiator photocured by irradiating UV, wherein the ladder-structured polysilsesquioxane comprises a methacryl group and radical photocuring occurs under the UV irradiation.

8. The gas separation membrane according to claim 1, wherein the gas separation membrane separates a gas selected from a group consisting of $CO_2$, $H_2$, He, $O_2$, $CH_4$, $C_3H_6$, $C_3H_8$ and $N_2$.

9. The gas separation membrane according to claim 1, wherein the ladder-structured polysilsesquioxane is blended with rubbery or glassy polymer.

10. The gas separation membrane according to claim 1, wherein the ladder-structured polysilsesquioxane has an intramolecular periodic chain-to-chain distance of about 12.7 to 13.4 Å.

11. The gas separation membrane according to claim 7, wherein the ladder-structured polysilsesquioxane comprises one or more crosslinkable organic functional group as a side chain.

12. The gas separation membrane according to claim 7, wherein the ladder-structured polysilsesquioxane is represented by Chemical Formula 1:

<Chemical Formula 1>

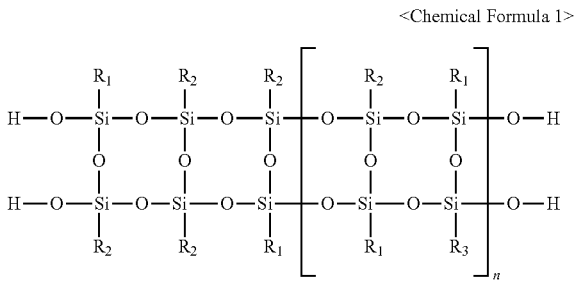

wherein each of $R_1$, $R_2$ and $R_3$ is independently selected from a group consisting of an alkyl group, an allyl group, an amine group, a halogen, an alkyl halogen, a vinyl group, an aryl group, a polyethylene oxide group, a methacryl group, an acryl group and an epoxy group and at least one of the $R_1$, the $R_2$ and the $R_3$ is a crosslinkable organic functional group selected from a group consisting of a vinyl group, an aryl group, a methacryl group, an acryl group and an epoxy group, and n is an integer from 1 to 10,000.

13. The gas separation membrane according to claim 7, wherein the photoinitiator is in an amount of 1-3 wt % based on the total weight of the mixture.

14. The gas separation membrane according to claim 7, wherein the gas separation membrane separates a gas selected from a group consisting of $CO_2$, $H_2$, He, $O_2$, $CH_4$, $C_3H_6$, $C_3H_8$ and $N_2$.

15. A gas separation membrane comprising a ladder-structured polysilsesquioxane with an amine compound thermally cured,
   wherein the amine compound is one or more cage-like silsesquioxane selected from a group consisting of octaaminophenyl-T8-silsesquioxane, decaaminophenyl-T10-silsesquioxane and dodecaaminophenyl-T12-silsesquioxane.

16. The gas separation membrane according to claim 15, wherein the thermal curing is performed at 210-280° C.

17. The gas separation membrane according to claim 15, wherein the amine compound is in an amount of 20 wt % or less based on the total weight of the mixture.

* * * * *